United States Patent [19]

Sidrak

[11] Patent Number: 5,281,145
[45] Date of Patent: Jan. 25, 1994

[54] PICTORIAL IMAGE TRANSFORMING MANIPULATIVES

[76] Inventor: Fahim R. Sidrak, 104 Teal Ct., Myrtle Beach, S.C. 29577

[21] Appl. No.: 416,030

[22] Filed: Oct. 2, 1989

[51] Int. Cl.$^5$ .............................................. G09B 23/02
[52] U.S. Cl. ................................. 434/215; 434/211; 434/212; 434/214
[58] Field of Search ............... 434/402, 404, 405, 428, 434/430, 211, 212, 215, 198, 199, 188, 214; 273/157 A; 235/61 B, 61 GM

[56] References Cited

U.S. PATENT DOCUMENTS

| | | | |
|---|---|---|---|
| 2,068,226 | 1/1937 | Buck | 434/405 |
| 2,167,131 | 7/1939 | Weidenborner | 434/405 |
| 3,565,462 | 2/1971 | Gottlieb | 434/430 X |
| 3,835,298 | 9/1974 | DeAndrea | 434/211 X |
| 4,435,162 | 3/1984 | Schoenwald | 434/215 |
| 4,537,576 | 8/1985 | Thorsheim et al. | 434/404 |
| 4,705,478 | 11/1987 | Djali | 434/404 X |

*Primary Examiner*—Jessica J. Harrison
*Assistant Examiner*—Jennifer Doyle

[57] ABSTRACT

The pictorial image transforming manipulatives are instructional visual aid devices adapted for use to demonstrate visually the applications of deductive reasoning in proving most of the geometry theorems in conjunction with a geometry course. The manipulatives can also be used to display visually many graphs which represent algebraic linear equations and inequalities in two variables, and compound inequalities on a number line. These applications of mathematical systems for demonstrated algebraic linear graphs, and other graphs, are designed in conjunction with algebra textbooks.

Each device uses one or more transparent overlays which rotate, translate, translate and rotate, flip over, or flip over and rotate to another position relative to a stationary underlaid plate. The manipulative devices are adapted for use on the overhead projector or for use in direct demonstration without a projector. These devices can be produced in small sizes for student use or in large blackboard sizes. The function of these manipulatives is to demonstrate visually a mathematical concept, a geometry theorem, a geometry problem, or a family of algebraic linear graphs.

5 Claims, 12 Drawing Sheets

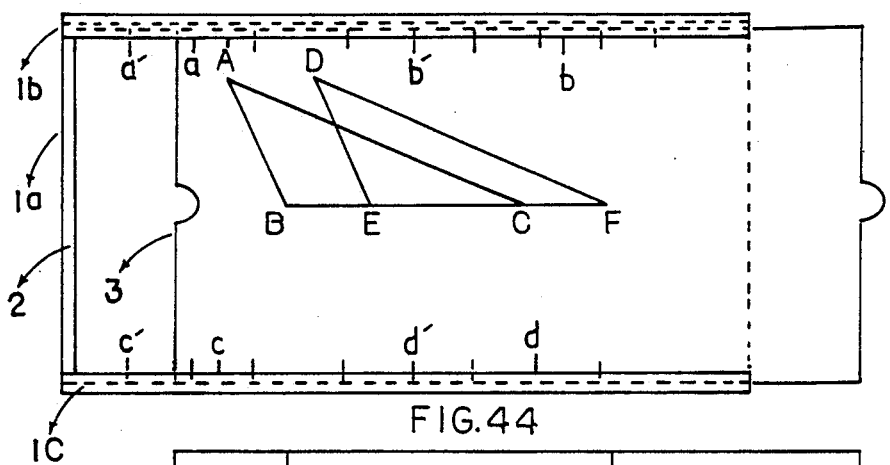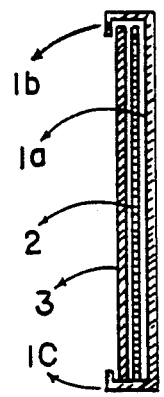
FIG.44　FIG.45
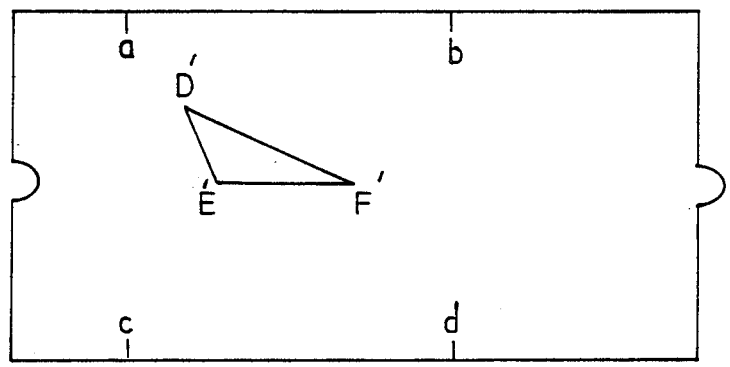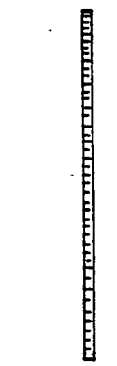
FIG.46　FIG.47
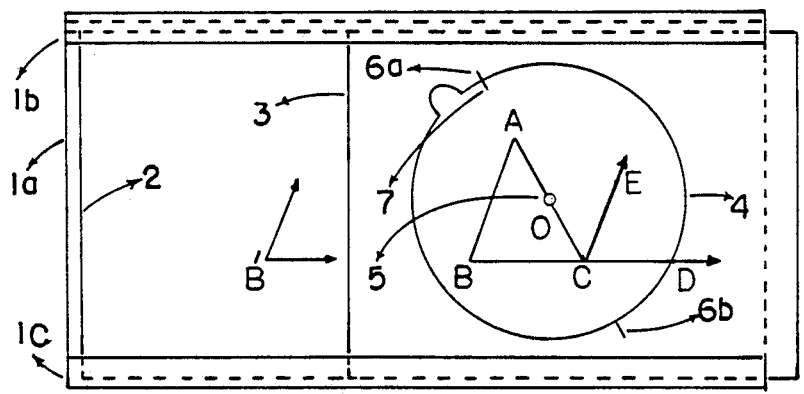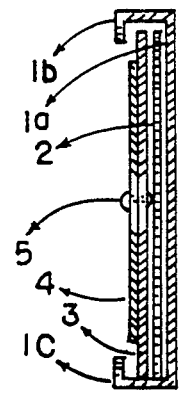
FIG.48　FIG.49
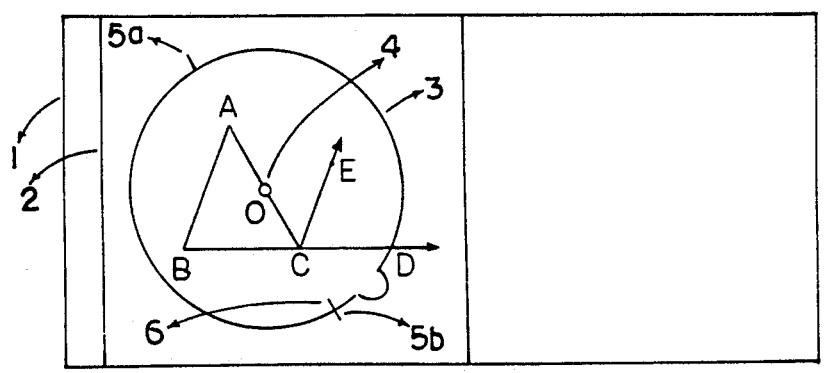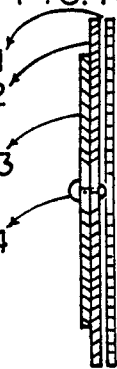
FIG.50　FIG.51

PICTORIAL IMAGE TRANSFORMING MANIPULATIVES

BACKGROUND OF THE INVENTION

1. Field

This invention relates to instructional visual aid devices which provide visual transformation of superimposed picture images over prescribed stationary pictures to aid in proving most of the theorems in a geometry course, using the method of deductive reasoning. These manipulatives can also be used to display visually geometric problem solving, mathematical concepts, or algebraic linear graphs for which a mathematical system can be found.

2. State of the Art

Overlay transparencies are widely used in education on overhead projectors for projecting a superimposed picture image over a stationary transparency. They are also used in direct demonstration without an overhead projector by overlaying a transparency on a flat opaque background surface. Many types of superimposed visual aid devices are known, such as those disclosed by U.S. Pat. Nos. 3,556,397; 3,827,163; 4,655,714; and 4,705,478. The disclosed U.S. Pat. No. 4,705,478 uses superimposed feature devices to demonstrate visually two theorems in geometry, where a geometrical construction is applied to locate a unique location for the entre of rotation in order to guarantee the superimposed feature to assume a desired location. The mechanism of operating the referred disclosed U.S. Pat. No. 4,705,478 is cumbersome, in that two members move in a curved path over the surface of a diagram and curved slots confine the pivotal movements to stop at the desired position. In the article of the disclosed patent, U.S. Pat. No. 4,705,478, the finished product does not show the circle circumscribed about triangle ABC, or the tangent CD of the circle at point C, the point of tangency. The circle and the tangent are essential features so that the device may agree with the methods of deductive reasoning in proving the theorem. However, the device appears to demonstrate that the sum of the angles of a triangle equals 180° using superimposed means in transforming two angles congruent to angles A and B to form with angle C a straight angle. The superimposed feature must have the diagram of the circumscribed circle and the tangent to the circle as a background so that the theorem can be supported by geometric logic. Consequently, the techniques applied in the disclosed patent device suggest the use of informal geometry. In the new invention, a prescribed entre of rotation that guarantees a superimposed feature is more feasible, advantageous, preferrable and practical, since many geometric theorems can be designed for visual aids, rather than using geometric construction to locate one or more entres of rotation for a prescribed diagram as applied in the disclosed U.S. Pat. No. 4,705,478. The features of U.S. Pat. Nos. 3,556,397; 3,827,163; and 4,655,714 are to display visually the values of the trigonometric functions, but not the behavior of their graphs.

The fundamental concept of the claimed present invention is to apply the transformation of a set of points, figures, or linear graphs such that the set of points of a figure or a line are symmetric with respect to the entre of rotation. Additionally, the devices demonstrate transformation of a picture image with respect to a picture through an axis of reflection and transformation of an image picture guided by two prescribed parallel lines. In this invention, the manipulatives do not always necessitate a set of points of a figure to be symmetric relative to the entre of rotation. Neither are the points always symmetric with respect to the line of reflection. The forthcoming article of the summary of this invention will provide concrete tangible applications for the claimed invention. The components of the devices of this invention are simple, easy to operate, long lasting, and inexpensive to produce. Thus, the basic advantage of this invention is its versitility of application(s) to almost all theorem proofs in a standard secondary geometry course. Previous patented inventions address a very limited scope of theorem applications. The same learning devices described have additional applications in illustrating algebraic graphs.

SUMMARY OF THE INVENTION

The pictorial image transforming manipulative devices of the claimed present invention are instructional aid devices, adaptable for use by classroom teachers and students. These devices can be made equally well from textbook picture print size to a convenient size for blackboard display. The devices may be produced in various forms, but generally they resemble other types of slide devices in appearance and operation. The main feature of the visual manipulative devices of the present invention is to transform one or more designated superimposed overlay image pictures over an underlaid prescribed stationary picture from one desired position to another desired position relative to the underlaid picture. The transformation of a designated superimposed image picture may demonstrate the visual motion for the process of the pattern of deductive reasoning in conjunction with the conventional writing of two column proofs as published in the geometry textbooks. The invention may also assist in the transformation of algebraic linear graphs, represented by an image picture with respect to an underlaid background of a prescribed origin of coordinate axes in a cartesian plane, to solve algebraic equations. The devices display the linear graphs for which a mathematical system or solution sets of these graphs can be found.

Thus the claimed pictorial image transforming manipulative devices include in principle five types of manipulative transforming devices:

1. The rotary pictorial image devices.
2. The translating pictorial image devices.
3. The incorporated rotary and translating pictorial image devices.
4. The reflecting pictorial image devices.
5. The incorporated reflecting and rotary devices.

1. The rotary pictorial images devices

The claimed rotary pictorial image device includes as basic a transparent or opaque picture member with an appropriately rectangular or square shaped flat surface; a transparent superimposed image picture member with flat circular disc, pivotally mounted with its center on the picture member to carry a subset of points of the designated image picture from one position to another desired position relative to a prescribed stationary picture print on the picture member. The diameter of the circular disc is smaller than the width of the rectangular picture member or the side of the square picture member. The picture member may include a written expression above the circular disc which represents a formula, a theorem, a mathematical concept, a problem solving, a title, or a label to indicate the objective of the manipulative device. The flat surface member may be of any convenient size provided it includes a prescribed picture or diagram on the stationary member to represent a geometric theorem, a mathematical concept, a problem solving, or a grid of parallel lines with an origin of coordinate axes of cartesian plane. The pictorial feature of the picture member can be in various forms such as an outlined diagram or a homogeneous shaded picture in solid color. The superimposed image picture member with flat circular disc may include a designated subset of points that represent a geometric picture, a diagram, or one line or more. In this invention, the geometric picture image print is a superimposed overlay relative to a stationary underlaid background for a prescribed picture. Thus the image picture functions as an auxiliary means to be transformed through rotation from one desired location to another desired location with respect to the underlaid picture print or the diagram.

In the rotary pictorial image devices of the present invention, the entre of rotation of the picture member is preset below the center of the rectangle, or the square flat surface, leaving space allocated on top of the picture image above the circular disc for a written heading expression, a formula of a geometry theorem, a mathematical concept, a title, a lable, or algebraic formula to illustrate the objective for which the visual manipulative is designed. The superimposed picture print can be mounted on the transparent circular disc with respect to the center of the circle and the underlaid picture.

The design of the picture print along with its associated picture image, and the entre of rotation can be created in conjunction with the theorems published in geometry textbooks to visually demonstrate these theorems in a form readily discernible. The rotary superimposed picture image incorporates the sequential structure process of deductive reasoning in the written statements of proving a geometry theorem. The picture print on the picture member may include manuscript in upper case or lower case alphabetical letter print to name the geometry figure or the diagram. A numbering system can also be used to name angles as an alternative labeling.

The entre of rotation on the picture member may represent a desired prescribed point such that the set of points of the figure of the picture member are symmetric with reference to the entre of rotation. This technique can be applied to demonstrate sets of pictorial congruent triangles such as the theorems of the parallelogram, the rhombus, the rectangle, the square, and whenever a segment of proofs of theorems pertaining congruent triangles posses points of symmetry. The devices can also find application in using the point which is equidistant from two parallel lines in geometry as a point of symmetry, i.e. the entre of rotation to show alternate interior angles are congruent. In this present invention, the entre of rotation may be chosen to a desired location to demonstrate similarity of triangles and overlapping congruent triangles. Again the entre of rotation is the focal point that sets the rotation feature such that the written mathematical statements can be produced in pictorial motion forms.

The superimposed feature may move over the main diagram in a circular path from a desired position to another desired position and is guided by aligning an indicating marking hairline on the circumference of the circular disc with two indicating marking hairlines on the picture member surface. The two hairlines on the picture member designate the desired positions for the superimposed features, rotation.

In manufacturing the product of these manipulatives, rigid vinyl of different gauges may be used such as clear or color transparencies, opaque colors, or a combination of both. Also, colored or clear infrared rigid transparencies can be used. The manipulatives can be produced in various sizes so that they may be adaptable for use on the blackboard, the overhead projector, or in sets mounted on flat surface planes with convenient sizes organized in a binder folder similar to the style of a resource book for student use.

The flat surface of the picture member of the present invention may be divided into four or six congruent regions. Each region includes a geometric figure associated with a flat circular disc, pivotally mounted with its center on the picture member. The circular disc includes a superimposed image picture which corresponds to the picture background. Each picture and image picture are paired with hairlines to guide the superimposed features as previously described. Thus a transparent flat surface may include four or six rotary pictorial image devices. Furthermore, the number of rotary pictorial image devices can be doubled by means of using an opaque flat survace. The opaque flat surface may include four or six rotary pictorial image devices on both front and back of the opaque flat survace such that each pair of the superimposed image picture members of the flat circular discs are pivotaloy mounted with their centers on the opposite sides of their corresponding picture members at the same entre of rotation of the flat surface. Thus a binder can combine and organize a number of plates with rotary pictorial images.

It is desirable sometimes to demonstrate visually a stationary underlaid picture member with replaceable or interchangeable superimposed picture image members. The interchangeable picture image members find applications in demonstrating many theorems in geometry concerning the topics of parallel lines, parallelograms, similarity, circles, or regular polygons. These devices apply formulas or statements with a hypothesis followed by more than one conclusion.

The interchangeable rotary pictorial image devices may include as a basic component a transparent, or opaque picture member with an appropriately rectangular or opaque flat surface, a fastener such as a drive pin snap, conic clip, or snap fastener. The fastener may be mounted on the entre of rotation of the flat surface member through pressing any of those fasteners into a prepared hole slightly smaller in diameter than the fastener width so that the fastener may be snugged securely in position. A set of transparent flat, circular discs with prepared holes in the center may be mounted with their centers through the fasteners on the picture member to allow the rotary feature. The circular discs may include picture images and can be pivotally mounted on the picture member by means of snapping the picture image member into the fastener so that the image picture can be rotated with respect to the picture print. Two picture image members may be mounted simultaneously. The superimposed image pictures can be guided by distinct color hairlines on the circumference of the circular discs which are paired with matching color hairlines on the picture member so that the two desired positions of the superimposed feature can be directed.

The interchangeable rotary pictorial image device may be made in any convenient size and can be adaptable for use on a classroom blackboard, overhead projector, or on a plate.

The rotary pictorial image devices with interchangeable picture images of this invention can be commonly used in demonstrating algebraic linear graphs and finding applications as visual instructional aids to derive algebraic equations or inequalities in two variables for mathematical systems. The basic components of the rotary picturial image devices for algebraic linear graphics include a cartesian plane member with appropriately marked flat surface, a transparent or opaque member. a superimposed algebraic graph member with flat circular disc, pivotally mounted with its center on the cartesian plane member at the origin of the coordinate axes.

The cartesian plane member may be of a rectangular or square shape of any convenient size, provided it includes marked abscissa axis normal the coordinate axis, extended a prescribed unit length from their origin in both positive and negative directions, and numerically calibrated from the initial point at the origin. The marked points on the coordinate axes indicate the calibrated units which include two sets of marking grid parallel guide lines, with one set parallel to the coordinate axis and the other set parallel to the abscissa axis. That superimposed algebraic graph member on the circular disc with its center pivotally mounted with respect to the cartesian plane on the origin of the coordinate axes. In demonstrating the superimposed feature of a linear graph, one half cycle rotation, i.e. 180° is needed, either clockwise or counterclockwise, because the linear equation of a line graph will reiterate if the line rotates one half cycle or more.

The equation of a superimposed picture of a linear graph with cartesian plane as a background can be found in several methods, using a slope and a point on a line, two points on a line, a slope-intercept equation, or intercepts with coordinate axes. A point on a line can be easily found by locating the ordered pair of the points of a linear graph reference to the coordinate axes. The superimposed linear member may include two intersecting linear graphs, two parallel lines, two perpendicular lines, a dotted line with a region shaded, hatched, or solid colored on one side, or two intersecting dotted lines with distinct colored region shades on one side of each line. The dotted lines represent a graph of an inequality with two variable in a mathematical system. The intersecting lines can be displayed to derive the solution sets of linear equations or inequalities with two variables. The preferred form of using the rotary pictorial image in graphics is to implement the interchangeable picture images for linear graphs since the cartesian plane is stationary and the mounting linear graphs are adaptable for use. The linear graph image member can be mounted on the cartesian plane individually or in pairs. Furthermore, the cartesian plane of the picture member may have an overlaid blank transparent surface disc pivotally mounted with its center on the origin of the coordinate axes of the cartesian plane. In this case, the blank disc can be used to graph a given linear equation or inequality in two variables for a given mathematical system and to derive a family of algebraic equations, inequalities, or curves at every position in the rotary features.

The rotary pictorial image devices find application in graphics such as in rotating graphs of quadratic functions or other algebraic function graphs about the origin of the coordinate axes in a cartesian plane as a background to demonstrate visually the behavior of the curves. The equations of the algebraic graphs are modified relative to their positions to the origin of the coordinate axes. When a graph is symmetric with respect to the origin of the coordinate axes and rotates one half cycle, i.e. 180°, the graph will be located in the exact previous position.

The quadratic function graphs or the other algebraic function graphs with their curves on changeable circular discs can be mounted individually with their centers on the origin of coordinate axes in a cartesian plane as previously described.

The rotary pictorial image devices are excellent instructional devices because they are demonstrated in a form that is readily discernible and the student can develop the perception and the visualization of the sequential structure of the proofs in geometry and the behavior of the algebraic graphs. The proofs of the theorems and problem solving in geometry appear to be abstract concepts which can be more difficult without visually perceiving the configuration of the elements of the figures in conjunction with the theorems and postulates. Thus the rotary pictorial image devices function as a production motion picture which produce the editorial context of the geometry or algebra textbooks in a visually demonstrating form, thereby better serving the learning process.

2. The translating pictorial image devices

The second manipulative transforming devices are the translating pictorial image devices. In the translation feature, a superimposed picture image slides in a linear path over an underlaid stationary picture. The claimed manipulative device of the present invention includes as basic components: a picture frame member with a transparent or opaque rectangular flat surface embodied two parallel channel track strips, slanted in U-shape grooves, extended along the lengths of the rectangle flat surface near the sweeping ends, and equidistant from the lengths; a flat, rectangular transparent picture member; a flat, rectangular, transparent superimposed picture image member.

The transparent picture member may be mounted on the picture frame member by inserting the edges of the side lengths of the picture member inside the grooves of the two parallel channel track strips. The picture member may include a prescribed geometric picture print of a diagram or a figure with its vertices named by alphabetical upper case and lower case letters or numbers to name the angles.

The picture image member may include a set of points to represent the superimposed feature of the picture member. The picture image member can be mounted on the picture frame member and overlaid on the picture member. The picture image member may be of shorter length than the picture member to allow clearance on the picture member for holding the picture member in a stationary position while operating the device.

The superimposed picture image member can slide smoothly over the picture member in a linear motion with reference to a prescribed underlaid picture as a background. The two parallel channel track strips guide the translation feature of the picture image member in a linear path over the stationary picture member. To ensure a smooth slide of the picture image member, both picture member and picture image members need to be fitted inside the two parallel channel track strips. Tolerance of a hair length must be allowed between the two edges of the picture image member and the two track walls inside the channel grooves. Also, the gauge of the track grooves needs to be slightly wider than the thickness of both picture and picture image members. The tolerance for clearance is designed to permit the superimposed picture image to float and slide smoothly over the picture member.

The translation of the superimposed picture image member over the underlaid stationary picture member finds applications in geometric topics such as overlapping congruent triangles, similar triangles, overlapping similar triangles, the derived formula to find the area of a parallelogram, the two corresponding angles of two parallel lines cut by a transversal, and in proving geometic theorems. Both picture and picture image members can be replaced with pairs of set members which again can be mounted on the picture frame member. The translation of the superimposed picture image member relative to the picture member can be guided by aligning an indicating hairline mark on the superimposed picture member with one or more indicating hairline marks on the picture member. The aligning feature guides the superimposed picture image to the desired positions relative to the underlaid picture print.

Thus the picture member includes a shaded solid colored acute triangle or an acute triangle outlined with three distinct colors, and its vertices named by upper case letters, such that one side of the triangle is parallel to the two parallel channel track strips and equidistant from the track strips. The superimposed picture image member may include a pictorial copy of the same triangle on the picture member. Now, the superimposed picture image member can slide over the stationary picture member at various desired positions. An indicating hairline on the superimposed image picture member can be aligned with the indicating hairlines on the picture member to ensure that they are in the desired position.

Three other permutable transformations of those congruent triangles can be rearranged in different forms. The picture image member can be removed, flipped over, and then remounted on the picture member. This version of the translation feature may proceed, guided by another set of distinct color hairlines on both picture member and picture image member. Again the picture image may be removed, then remounted upside down on the picture member. Lastly, the picture member can be removed, flipped over, and then remounted on the picture member. In every face of the four transformations, a distinct colored label number representing a hairline on the image picture member may match up with the corresponding colored label number representing the hairlines on the picture member. Thus, both picture member and picture image member include four sets of matching color hairlines to guide the positioning of these components during the four transformations.

Furthermore, the picture image member, which includes the triangle, may be replaced by another picture member with a picture print of a triangle similar to that triangle on the picture member.

Another embodiment of the translating pictorial image device is to mount the picture member securely behind the picture frame member by using four picture corner holders or two additional parallel channel track strips embodied on the opposite sides of the picture member. The picture image member may then be translated over the stationary picture member such that the picture frame member represents a shield in between.

In the preferred form of the translating pictorial image device is to embody a geometric picture print on the picture frame member itself so that the superimposed picture image member may be translated on the picture frame member. Therefore the translating pictorial image may be composed of two members instead of three as previously described.

The two congruent triangles represented in the picture member and picture image member in the translating pictorial image device can be the topic of a problem solving for congruent triangles. Since there is a visual demonstration of many configuration of pictures for the two congruent triangles, many problems on congruent triangles can be created by using identical marks to represent the corresponding parts of the congruent sides, the congruent angles, or a combination of both as applications on SSS, SAS, or ASA postulates, SAA theorems or HL theorem. Therefore numerous applications of congruent triangles proofs may be demonstrated.

The translating pictorial image device may apply pairs of acute congruent triangles, right, obtuse, isosceles or right isosceles pairs of congruent triangles. Any of those sets of the congruent triangles can be mounted on the picture frame member to use the process of the translation feature previously described. Furthermore, the sets of triangles in the picture and picture image member may be similar so that the translation of the superimposed image picture can demonstrate the theorems and problem solving of similar triangles. This manipulative features a broad application in geometry.

The translating picture image device of this invention finds applications as visual aid devices in illustrating graphics for inequalities in one variable. In graphics, each of the picture member and the picture image mamber may include a number line graph which represents the solution set of inequalities in one variable for a given mathematical system. The picture image graph can be translated to superimpose the picture graph so that the graph of the conjunction or disconjunction represents the compound sentence.

The image picture translating manipulatives of the present invention are excellent instructional aids because they visually display topics in geometry and algebra such as overlapping congruent triangles, overlapping similar triangles, other geometric theorems, mathematical concepts, graphics of inequalities in one variable, and the sets. Such display is well perceived and adds meaningful insight to mathematical topics that appear to be ambiguous or abstract.

3. The incorporated rotary and translating pictorial image devices

The basic components of the incorporated rotary and translating devices include a picture member and a picture image member mounted on the picture frame member as previously described in the translating pictorial image devices in this invention; a composite picture image member, i.e. a transparent rectangular flat surface congruent to the picture member in size; a transparent, flat, circular disc with its center pivotally mounted on the center of the rectangular flat surface. The diameter of the circular disc is relatively smaller than the width of the underlaid rectangle. This composite picture image can be mounted on the picture frame and overlay the picture member. The flat surface of the composite picture image may include a picture print or may be blank, and the overlaid circular disc must include a picture related to the underlaid pictures. Thus the picture member is mounted on the picture frame member, and the composite picture member is mounted on top of the picture member.

As previously stated, the rectangular surface of the composite picture member can be blank so that it translates the superimposed picture image on the circular disc to any desired position relative to the underlaid picture. The translation process follows a rotation for the superimposed rotary feature. If the design of the device needs a picture print on the rectangular surface of the composite picture image, one of the two rectangular surfaces can be stationary and the other one may be translated for the superimposed feature. Thus the underlaid picture member can be translated with respect to the overlaid composite picture image member of vice versa. In either case, the picture image on the flat surface disc can be rotated to the desired position for the superimposed feature as an additional transformation.

In summary, the picture member may slide over or under the composite picture image member in a linear motion, followed by a rotation. The translation and rotation process can be guided by hairlines in each transformation.

The incorporated rotary and translated pictorial image devices also find applications in demonstrating visually an algebraic linear graph. The picture frame member may include marks of grid lines with two coordinate axes intersecting at the origin to represent a prescribed cartesian plane. The origin of the coordinate axes of the cartesian plane may be placed at the center of the rectangular flat surface of the picture frame member with the abscissa axis parallel to the channel track strips. The center of the circular disc of the composite picture member coincides with the underlaid origin of the coordinate axes. The rectangular surface of the composite picture member may include a picture of an algebraic graph, inscribed in the superimposed image of the circular disc and a second linear graph can be drawn on the circular disc. Both graphs are graphed relative to the origin of the coordinate axes of the cartesian plane. Thus two algebraic graphs can be transformed over the cartesian plane. The linear graph on the rectangular surface can be translated over the cartesian plane, followed by a rotation of the overlaid linear graph on the disc. Therefore the two algebraic graphs conform to the configuration of many generated algebraic graphs ruled by mathematical systems in every position of the translation or rotation features, or their combination. This manipulative can apply the solution set of linear equations, graphs of inequalities in two variables, or the behavior of algebraic functions.

The incorporated rotary and translating pictorial image devices also finds applications as visual aid devices in demonstrating the transformation of graphs of quadratic functions or other algebraic functions about the origin of the coordinate axes in a cartesian plane. The transformation includes a rotation of an algebraic graph about the origin, a translation feature, or a combination of both. The transformations feature demonstrates the effect of the rotation, translation, or their combination relative to the origin of the coordinate axes and their conjunctions with the mathematical systems. Again, the curves themselves are unchanged in any of those transformations, but their equations will change.

The incorporated rotary and translating pictorial image devices of the claimed present invention is an excellent instructional visual aid device. This new version of the combined transformations of these devices is versatile and adapted for use in developing more instructional manipulative devices in both geometric and algebraic graphs.

4. The reflecting pictorial image transforming devices

The claimed pictorial image transforming devices include as basic components: a transparent or opaque picture member with a prescribed picture print on a flat surface; a flat superimposed picture image member which includes a picture image print of the picture member. The picture image member is attached to the picture member by a pair of hinge fasteners to attach the two members together at one end. The hinges serve as means to fold the two members for the superimposed features, then open them in a position such that the two members together are contained in a plane. In this flat position, the picture image member is symmetric to the picture image with respect to the line of reflection; i.e. the line contains the two hinges.

This technique can be used in geometric figures for theorems or problem solving whenever the manipulative applies a segment of a diagram or a figure with reflexive or identity elements or set of points symmetric with respect to the line that contains the hinge fasteners. In this present invention the axis of symmetry of a geometric figure is reflected with respect to the line that joins the two hinges of both picture and picture image members. The sets of points of the figure can be symmetric with respect to the line of reflection. Thus the set of points on the picture and the superimposed picture image in the flat surface position of the two plane members are symmetric relative to the axis of symmetry, i.e. the line that contains the pair of hinges. In some topics in geometry such as in similar figures the set of points of the picture and picture image members are not symmetric with respect to the line of reflection.

When the two flat surfaces of the picture image and the picture members of some geometric diagrams are completely closed, the superimposed picture image for a geometric diagram appears discernible with respect to the pictures, but when the picture image member opens in a flat position to form a plane with the picture member, the picture image can be reflected and displays visually an insight into what appeared once a distorted picture image. Geometric pictures in overlapping triangles, similar triangles, or overlapping similar triangles are perceived in incomprehensible fashion. With the reflection feature, the picture image can be demonstrated visually in a form readily recognizable and quickly comprehended.

5. The incorporated reflecting and rotary device

The incorporated reflecting and rotary device of this invention comprises two rotary pictorial image devices attached with their flat surfaces of the picture members by a pair of hinge fasteners at one end so that the two flat surfaces may be contained in a plane in the open position. The rotary pictorial image devices comprise two flat circular discs with image pictures pivotally mounted with their centers on the underlaid flat surfaces of the picture members as previously described. The two image picture members of the flat circular discs are intercepted between the picture members of the flat surfaces and the centers of the circular discs coincide when the two flat surfaces are folded and closed completely. Thus the incorporated reflecting and rotary device incorporate, reflecting and rotating features of figures. In this device, the two circular discs may create an air vacuum when the two planes of the picture members are completely closed and as a result the two flat surfaces of the picture members may stick together and can not be easily opened. To eliminate such vacuum, two or more small track strips may be embodied on one of the two flat surfaces on the border of the circumference of a circular disc such that the two track strips are extended to overpass tiny regions of the discs. The two track strips preferably may be located on equal arc lengths with respect to the circular disc. Thus the two track strips function as barriers to stop the two discs from sticking. Meanwhile, the grooves inside the two track strips preserve the rotation feature of the circular discs.

In another form of the incorporated reflection and rotary device of this invention, a rotary pictorial image device may be attached with a flat surface of a picture member by a pair of hinge fasteners at one end. In some geometric device designs, the circular disc may include the picture image of the picture of the attached flat surface of the picture member, leaving the underlaid flat surface of the circular disc blank. The incorporated reflecting and rotary device reflect the superimposed picture image relative to the line of reflection which is followed by a rotation to a desired position guided by aligned indicating hairlines. Thus this manipulative device may visually demonstrate overlapping congruent triangles or overlapping similar triangles in two separate planes and in a form readily perceivable. This device of the present invention may be applied in proving geometric theorems which are ambiguous. The main feature of the incorporated reflecting and rotary device of this invention is to include two picture prints on the flat surfaces or a picture print on one flat surface leaving the other flat surface blank, and in either case the circular disc(s) include picture images. When the two planes are completely closed, the device demonstrates visually the picture, diagram, or figure that represent a geometric theorem. The two planes may then be opened in a flat position and each circular disc can be rotated to a desired position to display the process of deductive reasoning in proving geometric theorems.

BRIEF DESCRIPTION OF THE DRAWINGS

FIGS. 7, 8, 9, 21, and 22 are manipulative devices designed to visually demonstrate the process of proving geometric theorems using the deductive reasoning.

FIGS. 6, 11, 12, 13, 14, 15, 16, 18, 19, and 20 demonstrate applications for geometric theorems, postulates, definitions, and geometric problem solving.

FIG. 10 demonstrates the property of a square.

FIG. 17 demonstrates an application in similarity in geometry which also can be used as a topic in a physical science curriculum.

FIG. 23 demonstrates the geometric interpretation of the square of a binomial which is applied in algebraic topic.

Figure 31:
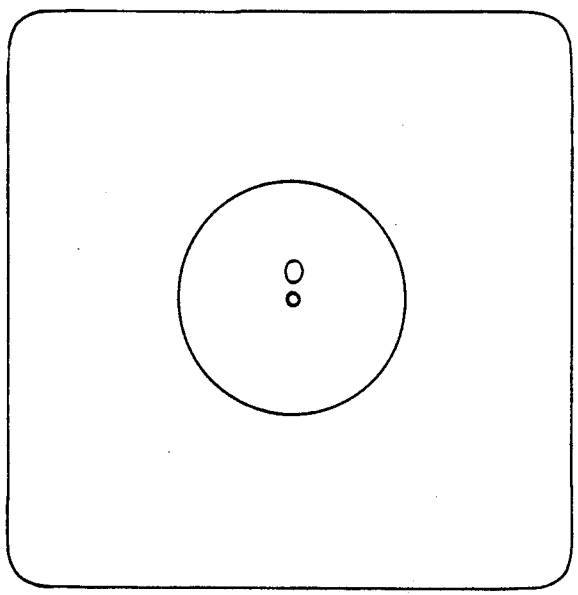
FIG. 31 is a top view of an additional picture member for the interchangeable rotary image device which includes circle O as underlaid picture.
Figure 32:
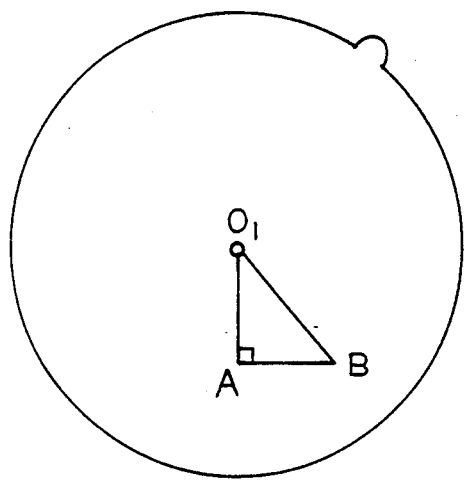

Each of FIGS. 32 through 36 is a top view of the interchangeable image picture member with their centers O mounted individually on the picture member of FIG. 31. These interchangeable image picture members demonstrate geometric theorems of circles when each is mounted separately on FIG. 31.

Figure 37:
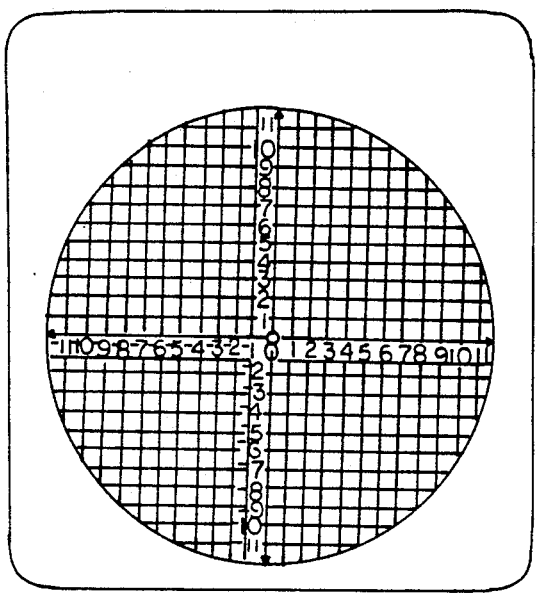

FIG. 37 is a top view of a picture member of the interchangeable rotary image device of algebraic graphs. This picture member of FIG. 37 comprises a flat surface, opaque or transparent, with marked grid of prescribed intersecting parallel guide lines which include coordinate axes extended a unit length from their origin to represent the cartesian plane; a fastener such as a drive pin, conic clip, or snap fastener is mounted on the origin of the coordinate axes of the cartesian plane. The fastener can also be embodied on the flat surface and that is an alternate optional design.

Figure 38:

FIG. 38 is a side view of the picture member of FIG. 37.

FIGS. 39 through 43 are front views of the image picture members of the interchangeable rotary image device of algebraic graphs. These image pictures can be mounted with their centers O on the origin of the cartesian plane of the underlaid picture member of FIG. 37. Again, those image picture members can be mounted individually, or by pairs.

FIG. 44 is a top view of the translating pictorial image device.

FIG. 45 is a side view of the translating pictorial image device for FIG. 44.

FIG. 46 is a top view of interchangeable picture image member for a triangle similar to the triangle ABC on the picture member of FIG. 44.

FIG. 48 is a top view of the incorporated rotary and translating pictorial image device.

FIG. 49 is a side view of the incorporated rotary and translating pictorial image device of FIG. 48.

FIG. 50 is a top view of the picture member and the composite picture image member which shows the translation feature when the vertex of angle B is translated so that it coincides on angle B, then coincides again on vertex C of angle ECD.

FIG. 51 is a side view of the picture member and the composite picture image member of FIG. 50.

Figure 52:
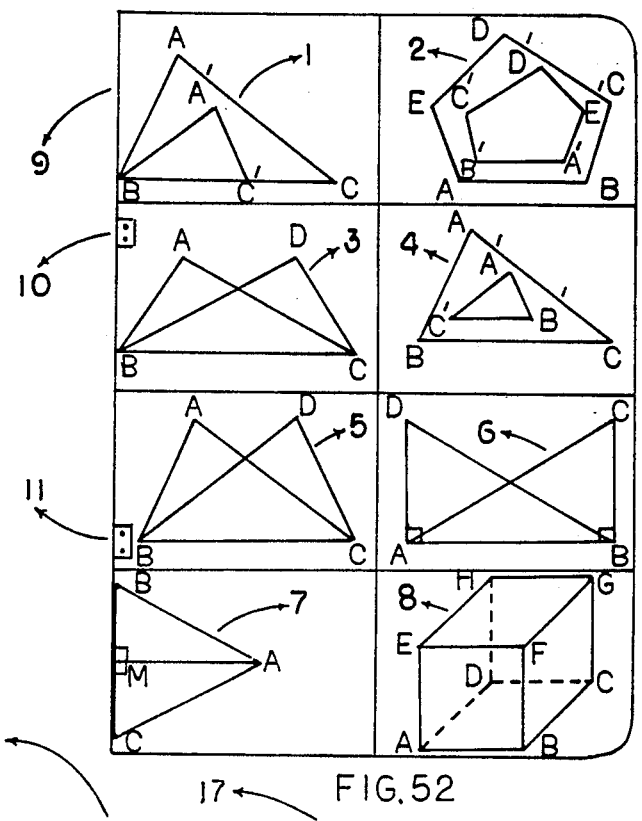

FIG. 52 is a front view of the reflecting pictorial image device when the flat surface members for the picture and superimposed picture image are folded and completely closed.

Figure 53:
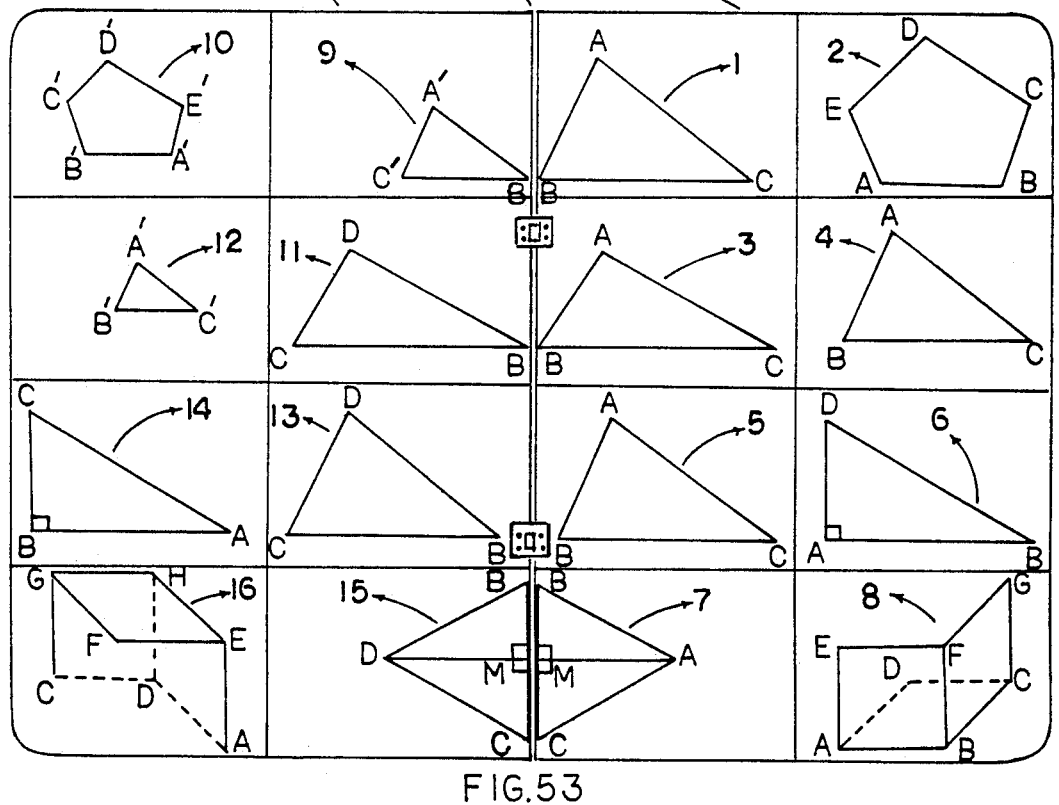

FIG. 53 is a front view of the reflecting pictorial image device when the superimposed picture image member is in a flat position with the picture image member such that the two members are contained in a plane.

Figure 54:
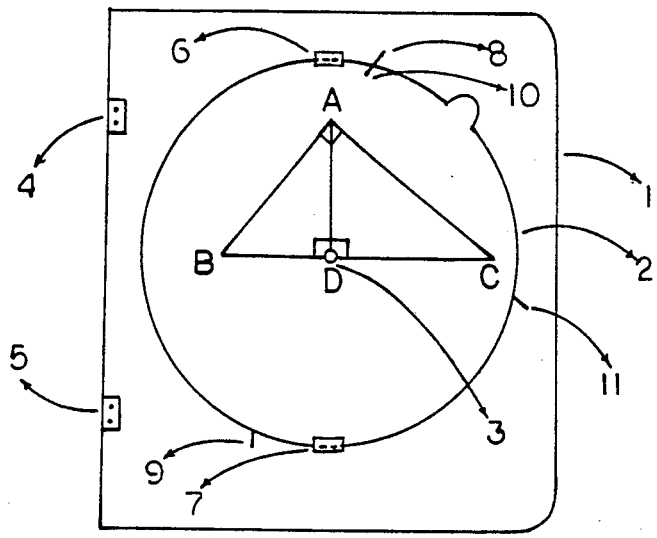

FIG. 54 is a front view of the incorporated reflecting and rotary devices when the two flat surfaces are folded, and completely closed.

Figure 55:
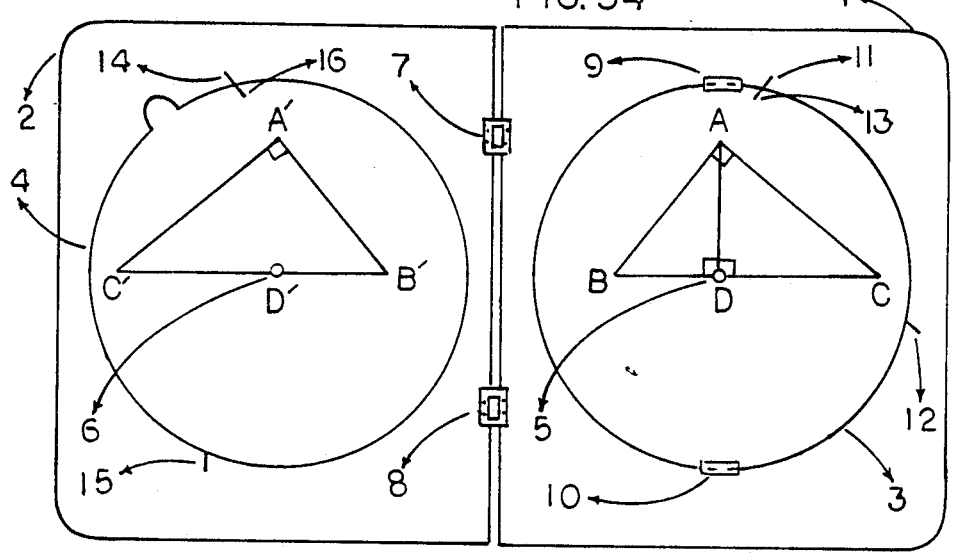

FIG. 55 is a front view of the incorporated reflecting and rotary device when the two flat surface members are opened in a flat position and contained in a plane.

Figure 56:
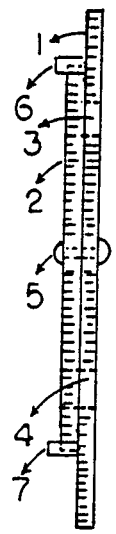

FIG. 56 is a side view of the incorporated reflecting and rotary device of FIG. 55.

Figure 57:
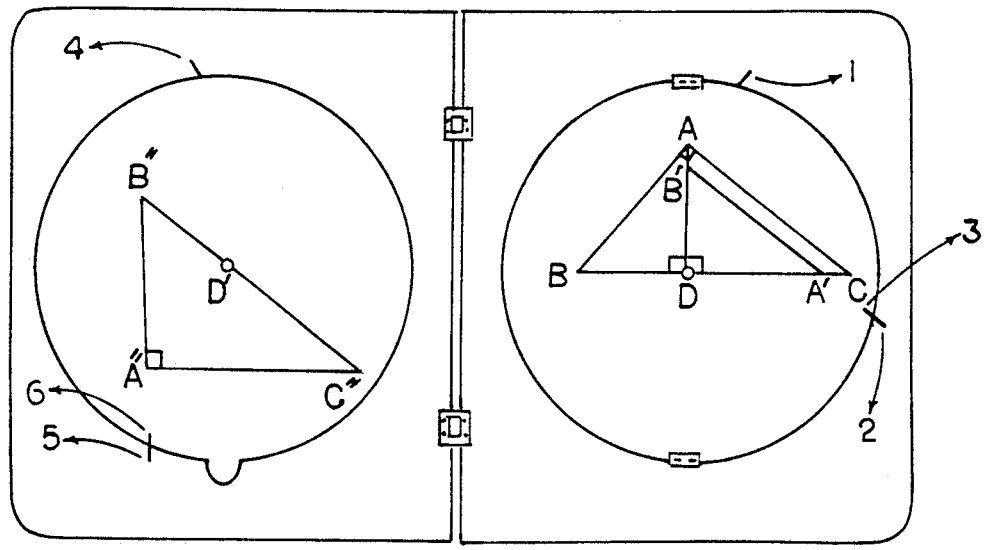

FIG. 57 is a front view after the two discs in FIG. 55 were rotated to the desired positions by aligning the indicated hairlines on the circumference of the circle with the corresponding hairlines on the flat surfaces.

Figure 58:
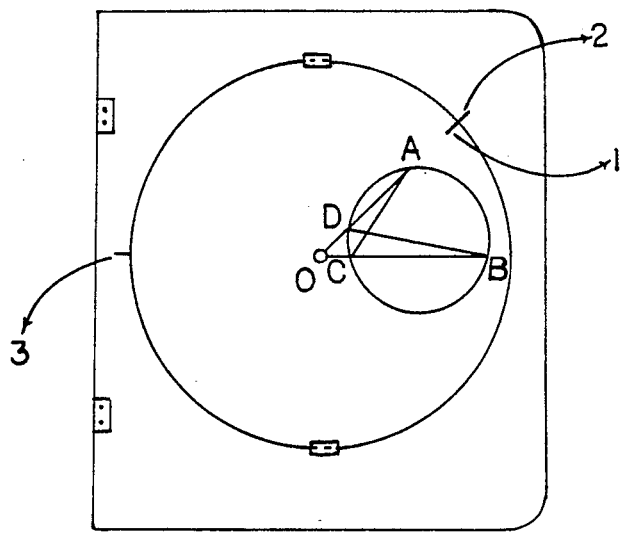
Figure 59:
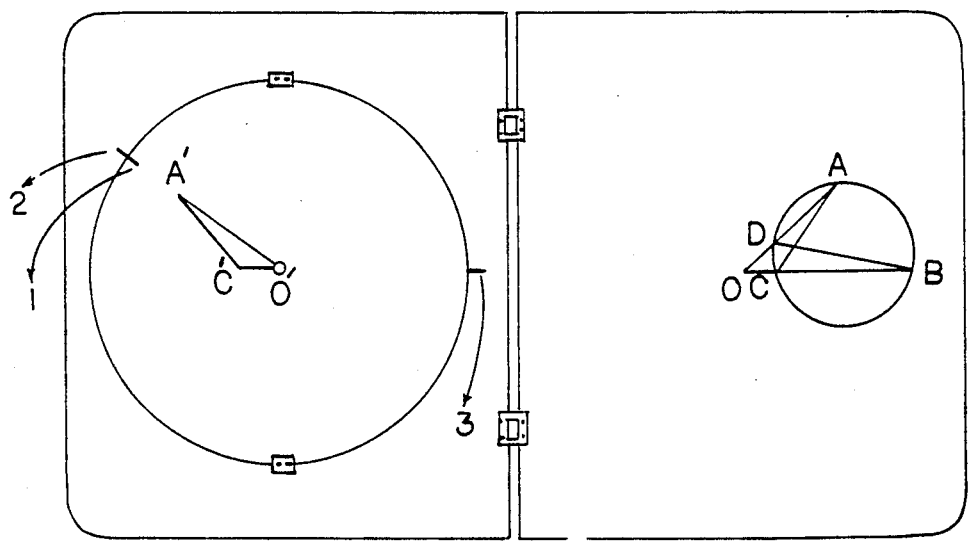
Figure 60:
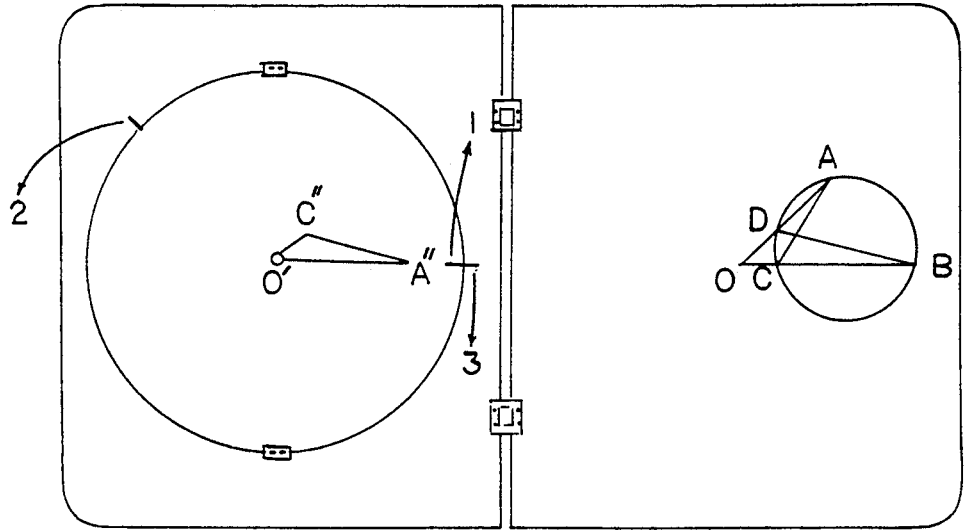

FIGS. 58 through 60 are front views for a second application of the incorporated reflecting and rotary device to prove a geometric theorem on the circle.

Figure 61:
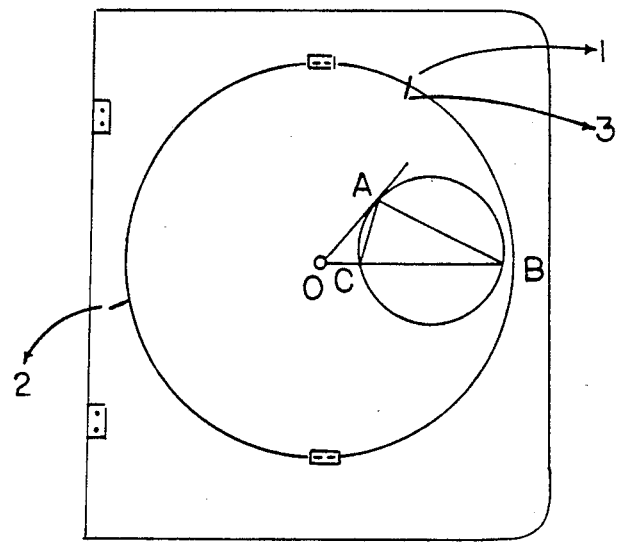
Figure 62:
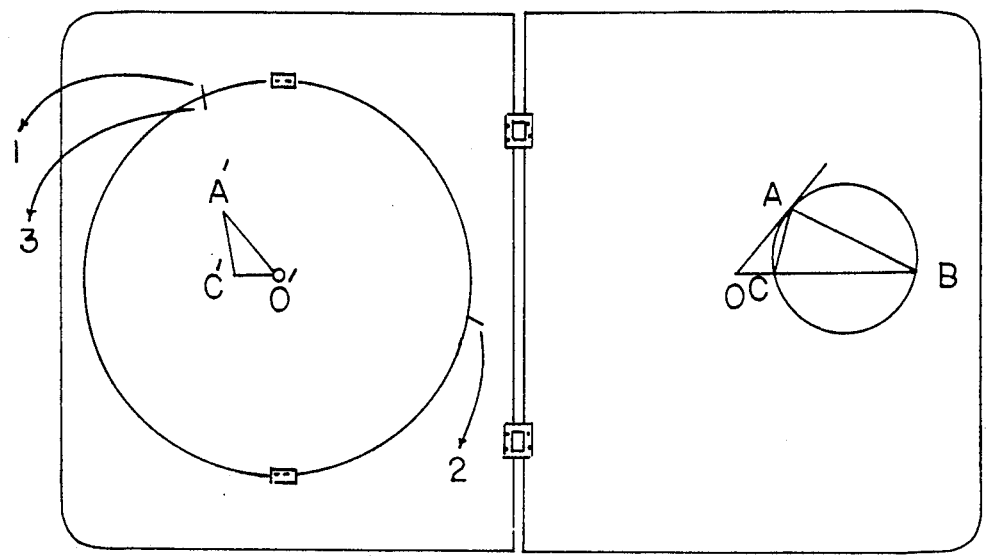
Figure 63:
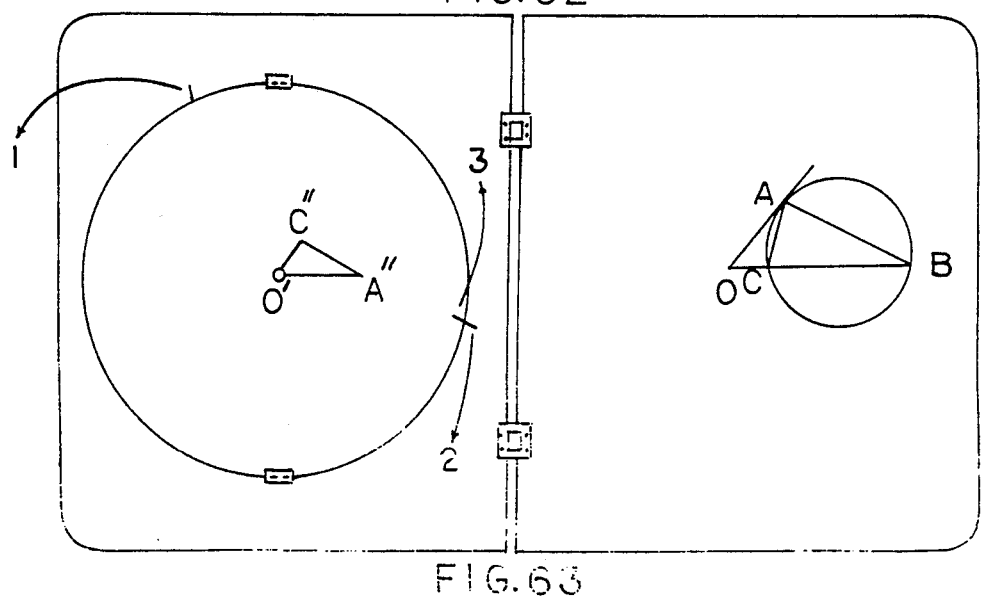

FIGS. 61 through 63 are front views for a third application of the incorporated reflecting and rotary device to prove a third geometric theorem on the circle.

DETAILED DESCRIPTION OF THE INVENTION AND THE ILLUSTRATED EMBODIMENTS

The description of the manipulative devices of this invention presented herein provides the functional features of the devices as they relate to geometry and algebra textbooks. This article does not provide the detailed proofs of the theorems described in the textbooks. However, it does visually demonstrate the basic concepts used in proving geometric theorems, algebraic graphs, and other mathematical systems.

The scope of the present invention is not confined by the applications of the pictorial image transforming manipulative devices as designated on the sets of drawings herein because the invention is basically designed to create curriculum courses in geometry or algebraic graphs, or to demonstrate a mathematical concept or a mathematical system using the five pictorial image transforming manipulative devices as previously described in the summary of the invention. These devices include:

1. The rotary pictorial image devices.
2. The translating pictorial image devices.
3. The incorporated rotary and translating pictorial image devices.
4. The reflecting pictorial image devices.
5. The incorporated reflecting and rotary devices.

Figure 1:
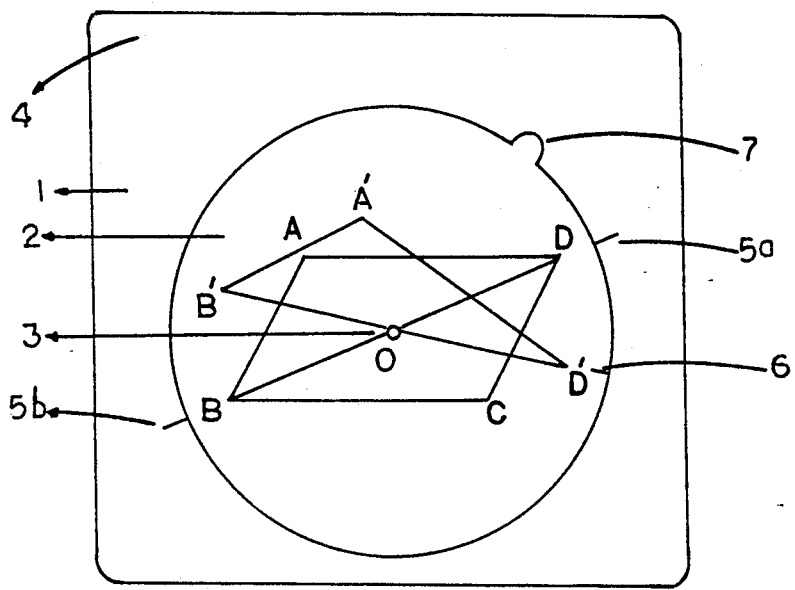
FIG. 1 is a top view and FIG. 2 is a side view of the rotary pictorial image device.

In FIG. 1, the picture member includes a prescribed imprinted parallelogram ABCD on an opaque or transparent flat surface 1 for the underlaid picture. The picture image member includes imprinted triangle ABD on a transparent flat circular disc 2, pivotally mounted with its center 3 on the picture member at the entre of rotation, i.e. the midpoint of BD. The space 4 on top of the picture member is designated for writing the formula of the geometry theorem for which the manipulative is designed to demonstrate, i.e. to prove a geometry theorem which states "A diagonal of a parallelogram divides the parallelogram into two congruent triangles".

In the initial stage of demonstrating the proof of this theorem, the picture image of the surface disc can be rotated using handle 7 such that the indicated hairline 6 on the circumference of the picture image member can be aligned with the indicated hairline 5a on the picture member. The picture image member may then be rotated clockwise or counterclockwise so that the indicated hairline 6 lines up with the indicated hairline 5b on the picture member. Thus, the proof of this theorem can be visually demonstrated in that triangle ABD is congruent to triangle CDB. This manipulative shows that the vertices of triangle ABD correspond to the vertices of triangle CDB such that A corresponds to C, B corresponds to D, and D corresponds to B. The students often write the correspondence of the two congruent triangles incorrectly.

The manipulative in FIG. 1 can also be used in proving three more geometry theorems. Those theorems state "Opposite sides of a parallelogram are congruent," "Opposite angles of a parallelogram are congruent," and "If two parallel lines are cut by a transversal, then alternate interior angles are congruent." Since the two triangles of a parallelogram are congruent, it follows that opposite sides are congruent and opposite angles are congruent because the corresponding parts of the two congruent triangles are congruent.

Figure 2:
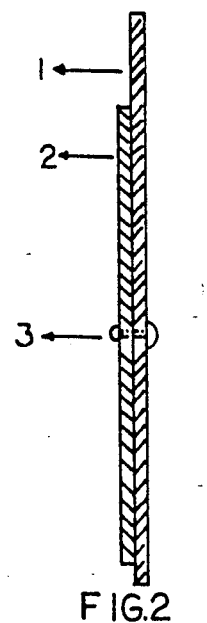

FIG. 2 is a side view of the rotary pictorial image device with the picture member 1 and the superimposed picture image 2 pivotally mounted with its center 3 on the picture member 1.

Figure 3:
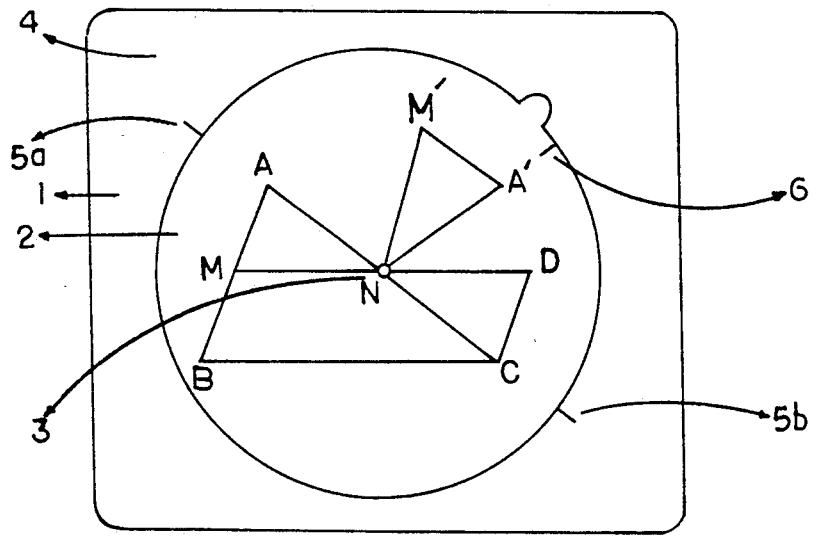
FIG. 3 and FIG. 5 are top and back views of the rotary pictorial image device with two flat circular discs pivotally mounted with their centers N on the same entre of rotation on the front and the opposite side of an opaque flat surface which include two diagrams to represent the picture members on both sides of the opaque flat surface.

FIG. 3 is a front view of an opaque picture member 1 which includes a prescribed imprinted triangle ABC with segment MN joining the midpoints of AB and AC and the line drawn from C parallel to BA intersects MN at D. The picture image member 2 includes triangle NA' M' congruent to triangle NAM, and is pivotally mounted with its center 3 on the picture member 1.

Figure 4:
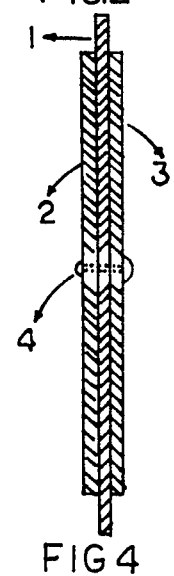
FIG. 4 is a side view of the rotary pictorial image device with an opaque flat surface as a picture member of FIGS. 3 and 5.
Figure 5:
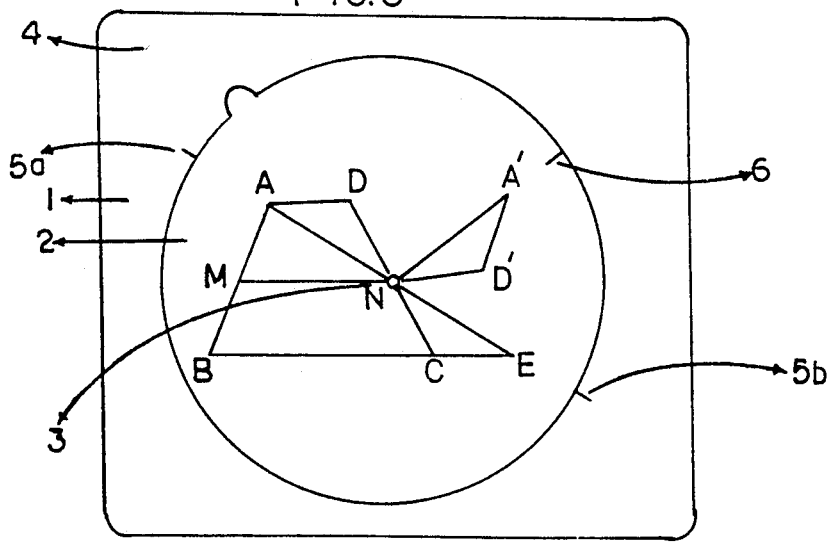

FIG. 4 is a side view for FIG. 3 and FIG. 5 combined. The opaque flat surface 1 includes the picture member of FIG. 3 on one side and the picture member 1 of FIG. 5 on the opposite side. The picture image members 2 and 3 of FIG. 4 are the side views of the picture images 2 of FIG. 3 and 2 of FIG. 5 respectively which are pivotally mounted with their centers 4.

FIG. 5 is a front view of the opposite side of FIG. 3. In FIG. 5, the picture member 1 includes a prescribed imprinted diagram for a trapezoid ABCD with the median MN joins M and N, the midpoints of the two nonparallel sides AB and DC respectively, and with AN and BC extended to meet at E. The picture image member 2 includes triangle NA' D' which is congruent to triangle NAD and pivotally mounted with its center 3 on the picture member 1. This rotary pictorial image device is designed to be used with a geometric theorem which states "The segment that joins the midpoints of the two nonparallel sides of a trapezoid is parallel to the two bases and has a length equal to one half the sum of the lengths of the bases." The process of proving this theorem is to show that triangle NAD is congruent to triangle NEC. The picture image can be rotated for the superimposed feature of triangle NA' D' over triangle NAD which can be guided by aligning the indicated hairline 6 with the hairline 5a, then rotating the picture member again for the superimposed feature of triangle NA'D' over triangle NEC. Thus triangle NA'D' functions as an auxiliary tool to show that triangle NAD is congruent to triangle NEC.

FIGS. 6 through 11 are front views of six rotary pictorial image devices with six picture images which are imprinted on the same transparent or opaque flat surface as a background. The six corresponding picture image members have their centers pivotally mounted on the flat surface member. Thus six rotary pictorial image devices can be visually demonstrated on one flat surface member with six pictures underlaid. A new type of educational booklet may bind many sets of these designated multiple rotary pictorial image devices. The flat surface may have three holes along one margin so it can be placed in a binder.

Figure 6:
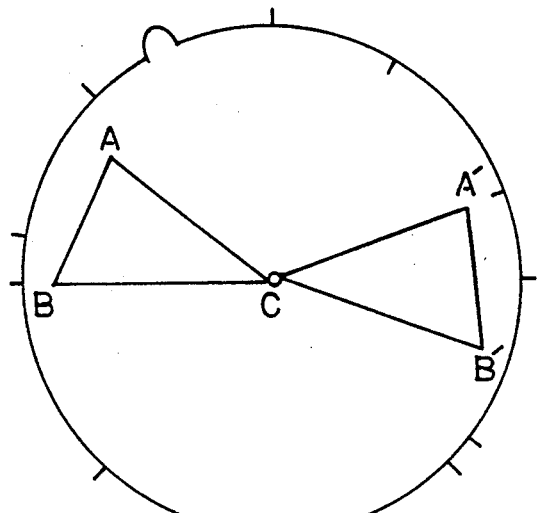
FIG. 6 through FIG. 23 are front views of the rotary pictorial image devices which demonstrate geometric theorems, geometric problem solving, and geometric applications.

In FIG. 6, the underlaid picture is triangle ABC and the picture image member of the flat disc is triangle A'B'C. The indicated hairline on the picture image member can be aligned with each hairline on the picture member to visually demonstrate the different positions of the two congruent triangles CA'B' and CAB and their overlapping positions.

Figure 7:
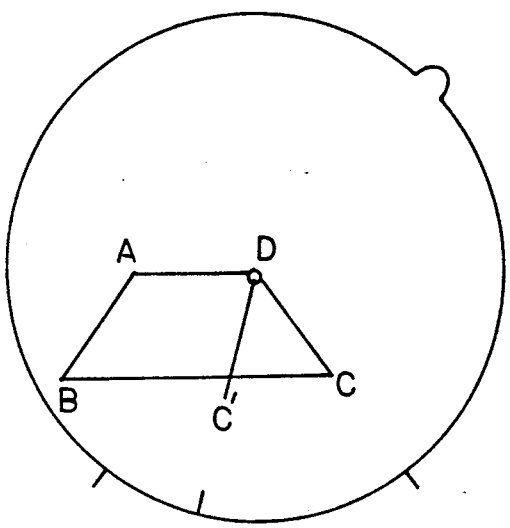

In FIG. 7, the underlaid picture is the isosceles trapezoid with AB and DC congruent. The picture image on the circular disc includes DC' congruent to DC. FIG. 7 demonstrates a manipulative used to prove a geometric theorem which states that "In an isosceles trapezoid, base angles are congruent." The process of proving this theorem is based on introducing a line from D parallel to AB and intersecting BC at C'. The hairline on the picture image member, i.e. the circular disc can be aligned with the hairline of the picture member opposite to DC so that DC' coincides with DC to show the isosceles trapezoid for the hypothesis of this theorem. The picture image can be rotated so that the hairline on the circumference of the circular disc can be aligned with the other hairline on the picture member so that point C' lies on BC and the manipulative in this position displays the formation of the parallelogram ABC'D.

Figure 8:
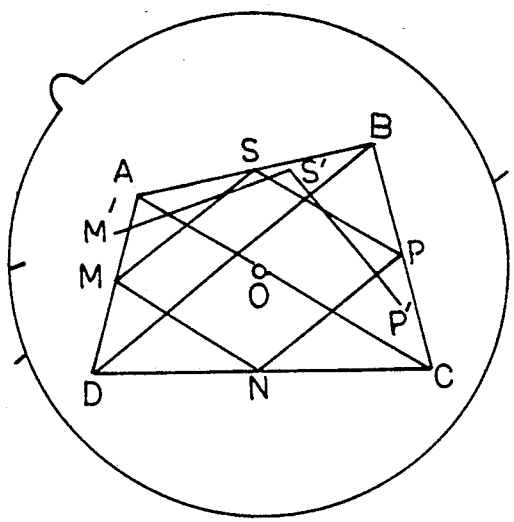

In FIG. 8, the underlaid picture member contains the quadrilateral ABCD with S, P, N, and M as midpoints of AB, BC, CD, and DA respectively and with diagonals AC and BD. The picture image on the circular disc includes S'M' and S'P' which are congruent to SM and SP respectively. This manipulative is used to prove a theorem in geometry which states that "The segments that join the midpoints of the sides of a quadrilateral form a parallelogram." To show that SPNM is a parallelogram, the opposite sides SM and NP can be proven congruent, and MN and PS can also be proven congruent. Using the alignment feature of the guided hairline on the circular disc with each of the two hairlines on the picture member, S'M' and S'P' may coincide first on SM and SP respectively. Then the second hairlines alignment guarantees S'M' and S'P' to coincide with NP and NM respectively. Thus the image picture, i.e. the circular disc with S'M' and S'P' performs as auxiliary means to show that SM is congruent to NP and SP is congruent to NM. Each of MS and NP is equal to one half BD and each of SP and MN is equal to one half AC according to a geometric theorem which is previously described in FIG. 3.

Figure 9:
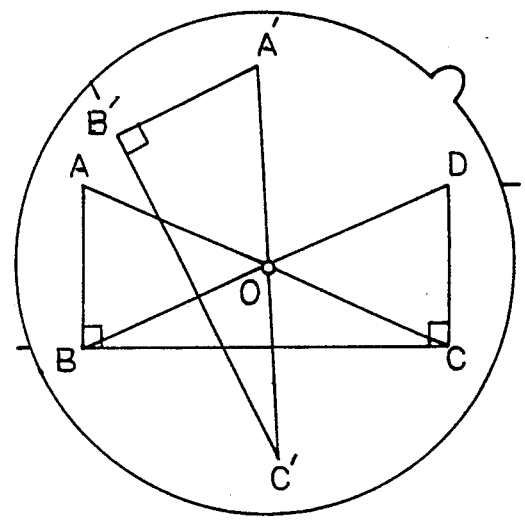

In FIG. 9, the underlaid diagram is the two congruent right triangles ABC and DCB with angles B and C as right angles. BC is a side in common, and O midpoint of AC and DB. The circular disc contains the right triangle A'B'C' congruent to triangle ABC, with angle B' a right angle and O midpoint of A'C'. This manipulative is used to prove a theorem in geometry which states that "In a right triangle, the median drawn to the hypotenuse is half as long as the hypotenuse." So, the given is triangle ABC is a right triangle with angle B is a right angle and BO is a median to the hypotenuse AC. Point D is located on BO such that BO equals DO and DC joins points D and C. The process of proving this theorem is to show that ABCD is a rectangle, then BO is one half BD. Therefore, BO is one half AC. Now, the hairline on the circular disc can be aligned first with the hairline opposite to vertex B, then with the other hairline opposite to vertex D. Thus, the vertices A' and C' may coincide with C and A respectively to form the rectangle ABCE so that the proof of this theorem can be visually demonstrated.

Figure 10:
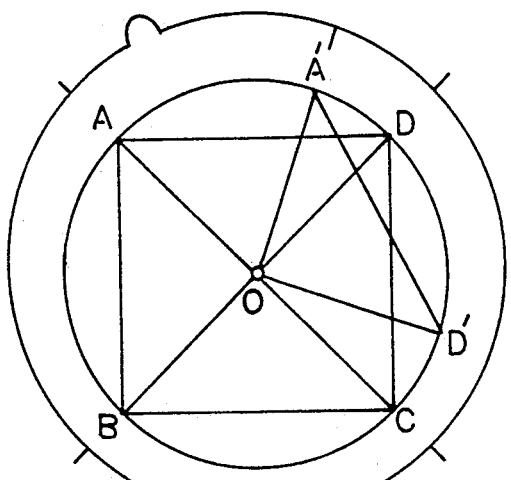

In FIG. 10, the underlaid picture is the square ABCD inscribed in circle 0 and with diagonals AC and BD. The circular disc includes triangle A'OD'. This manipulative demonstrates a geometric property of a square, which shows that the diagonals of a square divide the square into four congruent triangles. The aligned hairlines feature visually demonstrates the superimposed image of triangle OA'D' over each of triangles OAD, ODC, OCB, and OBA.

Figure 11:
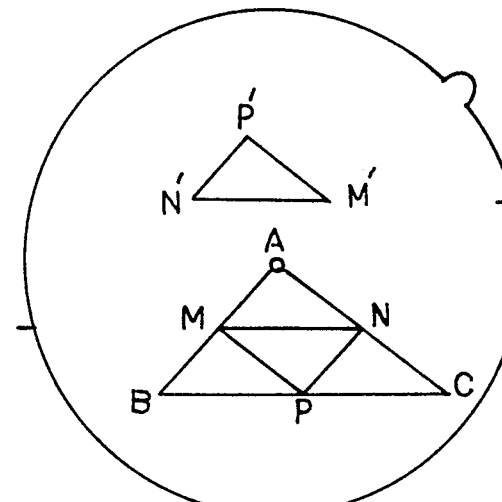

In FIG. 11, the underlaid picture is triangle ABC with M, N, and P midpoints of AB, AC, and BC respectively and segments MN, NP, and PM join the midpoints. The circular disc contains triangle M'N'P'. This is a problem solving in geometry which demonstrates that the segments that join the midpoints of three sides of a triangle divide the triangle into four smaller congruent triangles and each one of those triangles is similar to the original triangle. The aligned hairlines features demonstrates visually that triangles AMN, MBP, NPC, and PNM are congruent and each of those triangles is similar to triangle ABC.

Figure 12:
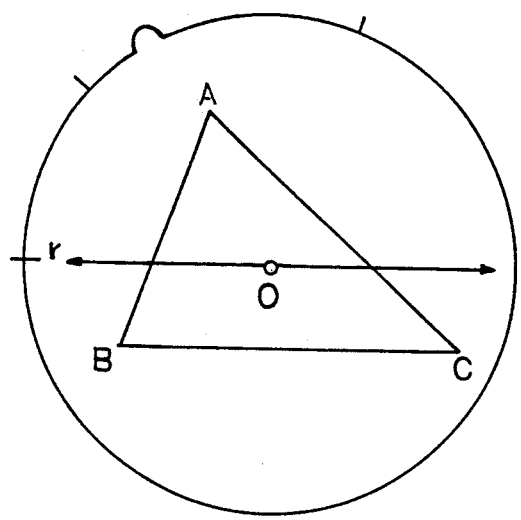

In FIG. 12, the underlaid diagram is triangle ABC and the circular disc contains line r. This is an application for similar triangle theorems in geometry. The alignment of the hairline on the circumference of the circular disc with the hairline on the background flat surface displays line r parallel to BC forming a smaller triangle similar to ABC. The rotation of the disc guided by the hairline on the circumference of the circular disc with each of the other two hairlines on the background surface guarantees line L to be parallel to AC, then parallel to AB forming two more triangles, each similar to triangle ABC.

Figure 13:
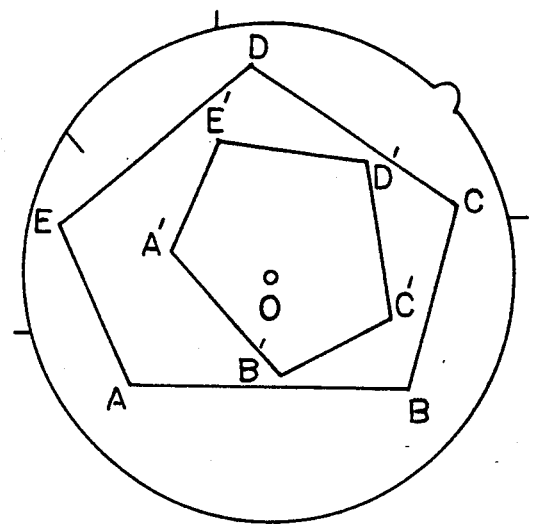

In FIG. 13, the underlaid diagram is pentagon ABCDE and the picture on the circular disc includes pentagon A'B'C'D'E'. This is an application on similar polygons in geometry. When the hairline on the circumference of the circular disc is aligned with the hairline closer to AB, the pentagon A'B'C'D'E' is visualized similar to the pentagon ABCDE where the corresponding angles of the two pentagons are congruent and the corresponding sides are proportional. However, the alignment of the hairline on the circumference of the circular disc with the other two hairlines on the background of the flat surface locate the pentagon A'B'C'D'E' in different positions relative to the pentagon ABCDE. Thus the two hexagons do not appear visually similar. In fact, the two pentagons are similar as long as they satisfy the definition of similar polygons.

Figure 14:
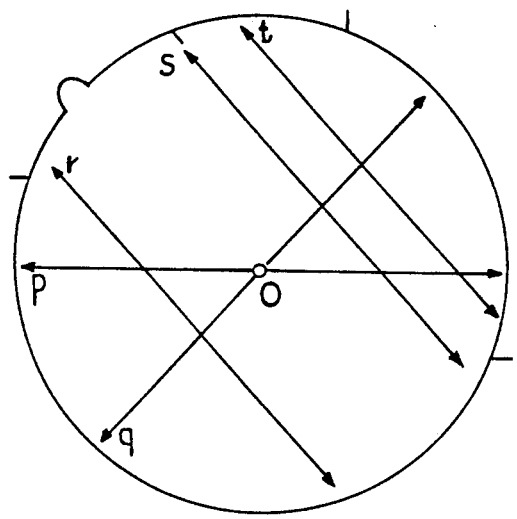

In FIG. 14, the underlaid diagram contains two lines P and Q which intersect at the entre of rotation O, and the circular disc contains the parallel lines r, s, and t. This manipulative is an application on congruent triangles and similar triangles in geometry. The rotation of the circular disc guided by the alignment feature of the hairline on the circular disc with each hairline on the flat surface background demonstrates sets of congruent triangles and similar triangles.

Figure 15:
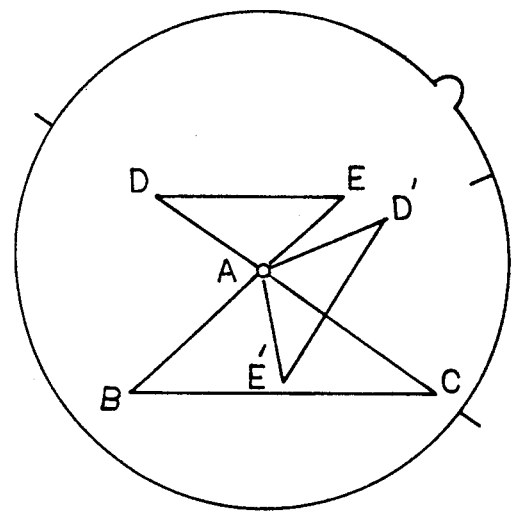

In FIG. 15, the underlaid diagram is the two triangles ABC and AED with BC parallel to DE. The circular disc includes triangle AE'D'. This is a problem solving in similar triangles in geometry which demonstrates DE parallel to BC; BE and DC include A. The problem is to show that triangle ABC is similar to triangle AED. Now, the circular disc can be rotated for aligning the hairline on the circumference of the circular disc with the hairline closer to point C on the background of the flat surface. The hairlines alignment generates a pictorial diagram of triangle AE'D' with points E' and D' on AB and AC respectively and E'D' parallel to BC. Thus another problem solving on similar triangles theorems can be generated. This pictorial rotary manipulative demonstrates visually the applications of the distinction of the basic proportionality theorem and the similarity theorems of two triangles in geometry.

Figure 16:
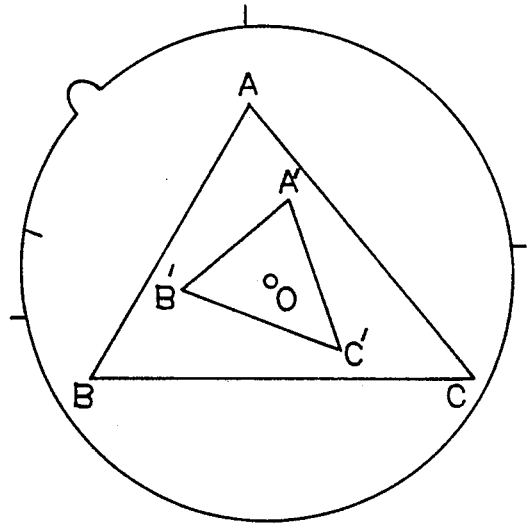

FIG. 16, the underlaid diagram is triangle ABC and the circular disc includes triangle A'B'C'. This is another application on similar triangles in geometry which resemble the manipulative designated in FIG. 13 in its concept. When the hairline on the circumference of the circular disc is aligned with the hairline which is closer to point B on the flat surface background, the triangle A'B'C' is clearly visualized similar to triangle ABC and the similarity theorems of the two triangles can be applied on the two similar triangles A'B'C' and ABC. When the circular disc hairline is aligned with the other two hairlines on the background of the flat surface, triangle A'B'C' may be positioned in different positions relative to triangle ABC. Again, the sets of the two triangles in these later positions are not perceived similarly. Thus the triangle ABC is similar to the rotary triangle A'B'C' at any position as long as the similarity theorems of the two triangles are satisfied.

Figure 17:
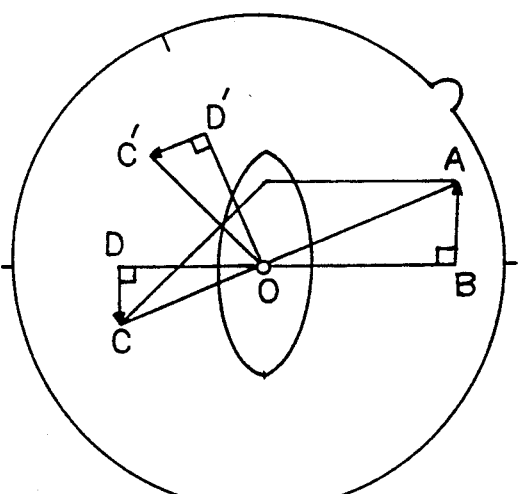

In FIG. 17, the circular disc includes triangle OC'D' and the underlaid diagram is the object AB and its image CD in a lens. BD is perpendicular to AB, CD, and the lens. This manipulative is used as application on similar triangles in geometry and in a physical science topic as well. The alignment of the hairline on the circular disc with each of the two hairlines on the flat surface background carries the image picture of triangle OC'D' to the desired position so that D' and C' lie on OB and OA respectively and the corresponding sides of the similar triangles OC'D' and OAB can be perceived visually similar. Thus the two triangles OAB and OCD are similar.

Figure 18:
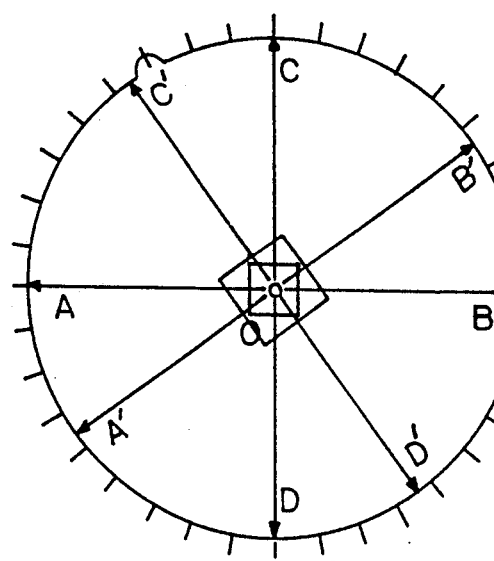

In FIG. 18, the underlaid diagram on the flat surface includes a circle with center O marked with a circular degree scale and with lines AB and CD perpendicular and intersecting at O. The circular disc includes two perpendicular lines A'B' and C'D' intersecting at O. This is an application of several theorems in geometry which state "Complement of congruent angles or the same angle are congruent," "Supplement of congruent angles are congruent," and "Vertical angles are congruent." The application of these theorems can be visually demonstrated by aligning the ray OB' of the circular disc with each of the marks of the circular degree scale on the circumference of the circle.

Figure 19:
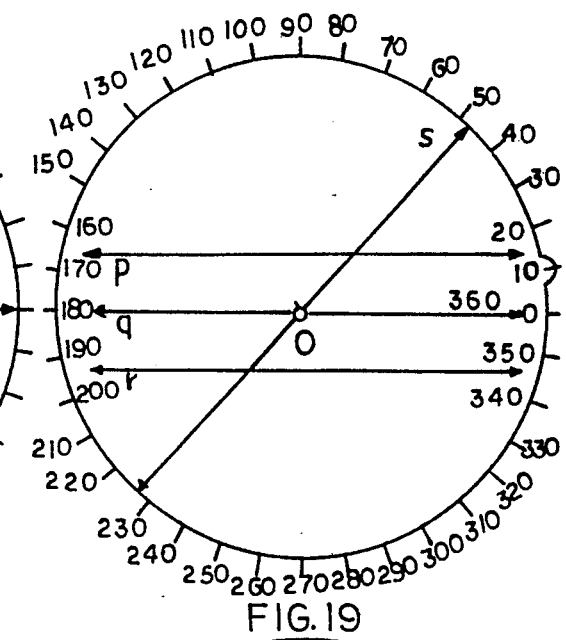

In FIG. 19, the underlaid diagram includes a circle O with circular scale, calibrated to indicate the central angle of the degree of measure of zero to 360°, and three parallel lines,p,q, and r. The circular disc includes line s which contains the center of the circle O. This manipulative demonstrates application of reading the measure of angle in degrees and provides application for geometric theorems which state "If two parallel lines are cut by a transversal, then alternate interior angles are congruent, alternate exterior angles are congruent, or same side interior angles are supplementary." FIG. 19 also provides application for an additional theorem in geometry which states "Vertical angles are congruent." The process of hairline alignments feature demonstrate visually the applications of these theorems.

Figure 20:
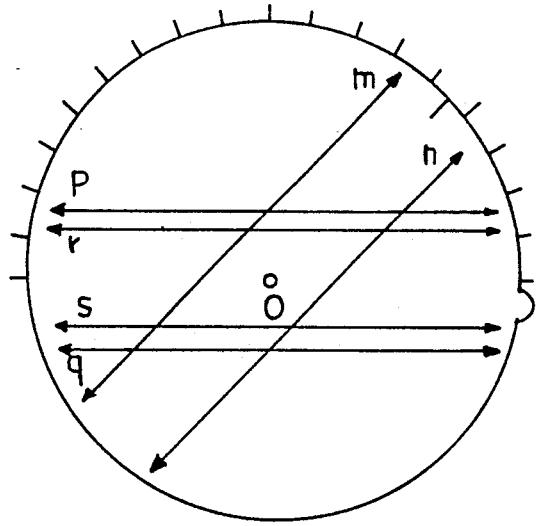

In FIG. 20, the underlaid diagram on the flat surface includes a set of hairlines on the background of the circumference circular disc and lines p,r,s, and q are parallel, with r and s equidistant from O, and p and q are equidistant from O. The circular disc includes lines m parallel to n such that the distance from the center O to lines r,s,m, and n are equal. This is an application for the definitions of the parallelogram, the rhombus, the rectangle, and the square. When the two parallel lines m and n are perpendicular to r and s, a square figure and a rectangular figure can be formed simultaneously. In any other position of lines m and n, families of parallelograms and rhombuses can be formed simultaneously with p, q, r, and s. The hairlines alignment feature demonstrate visually the definition of those quadrilaterals.

Figure 21:
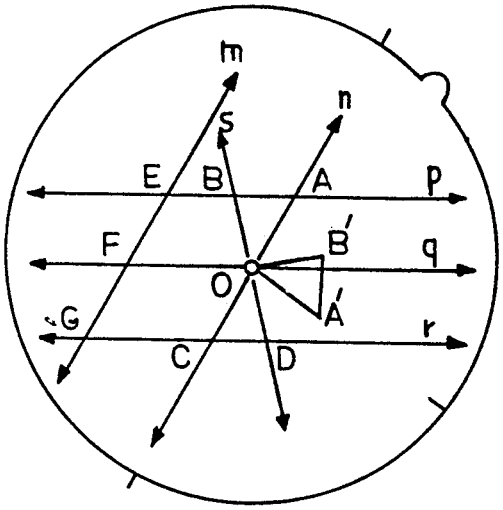

In FIG. 21, the underlaid diagram on the flat surface is the parallel lines p,q, and r, the parallel lines m and n, and the transversal s of lines p,q, and r. The entre of rotation O contains lines s, n, and q. The circular disc includes triangle OB'A'. This manipulative demonstrates a geometric theorem which states "If three parallel lines intersect two transversals, with intercepted congruent segments on one transversal, then they intercept congruent segments on the other transversal." The process of proving this theorem is to show that triangle OAB is congruent to triangle OCD. Using the hairline alignment as previously described, triangle OA'B' can be superimposed on triangle OAB with vertices A' and B' coincide on A and B respectively. Then the circular disc rotation can carry triangle OA'B' to coincide with triangle OCD with A'⟷C and B'⟷D. Of course a detailed written proof must apply additional geometric theorems of parallelogram and alternate interior angles of parallel lines.

Figure 22:
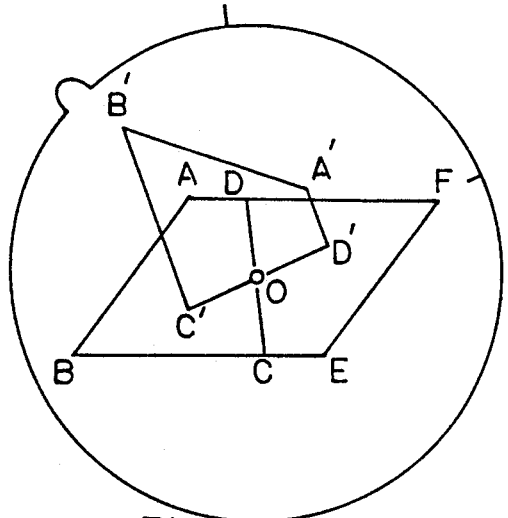

In FIG. 22, the underlaid diagram is a parallelogram ABEF with CD containing the entre of rotation O and intersect BE and AF at C and D respectively. O coincides on the disjoined diagonals AE and BF. The circular disc includes the trapezoid A'B'C'D' with C'D' containing O and the trapezoid A'B'C'D' is congruent to the trapezoid ABCE. This demonstrates a geometric theorem which states "The area of a trapezoid is equal to half the product of the height and the sum of the bases." The process of proving this theorem is to rotate the circular disc so that the trapezoid B'C'D' can be superimposed on ABCD and superimposed again on EFDC. Thus the area of the trapezoid ABCD is equal to half the area of the parallelogram ABEF. By showing CE is congruent to DA, the proof can be easily established.

Figure 23:
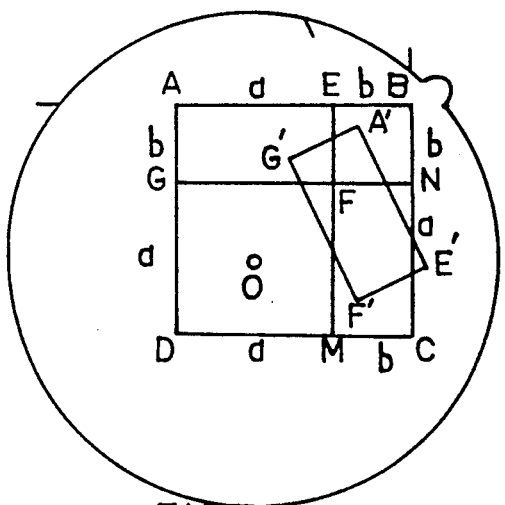

In FIG. 23, the underlaid diagram is the square ABCD with GN perpendicular to EM. EM is parallel to AD, and GN is parallel to AB. The entre of rotation is the center of the square GDMF. The circular disc includes rectangle A'G'F'E' which is congruent to each of the rectangles AGFE and NFMC. This is a geometric interpretation for an algebraic explanation of the square of a binomial which demonstrates $(a+b)^2 = a^2 + 2 + b^2$. In order to show that the rectangles AGFE and NFMC are congruent, the rectangle A'G'F'E' can be superimposed first over the rectangle NFMC then can be superimposed again over the rectangle AGFE. The hairline alignment may be used to guide the congruencies of the rectangles.

Figure 24:
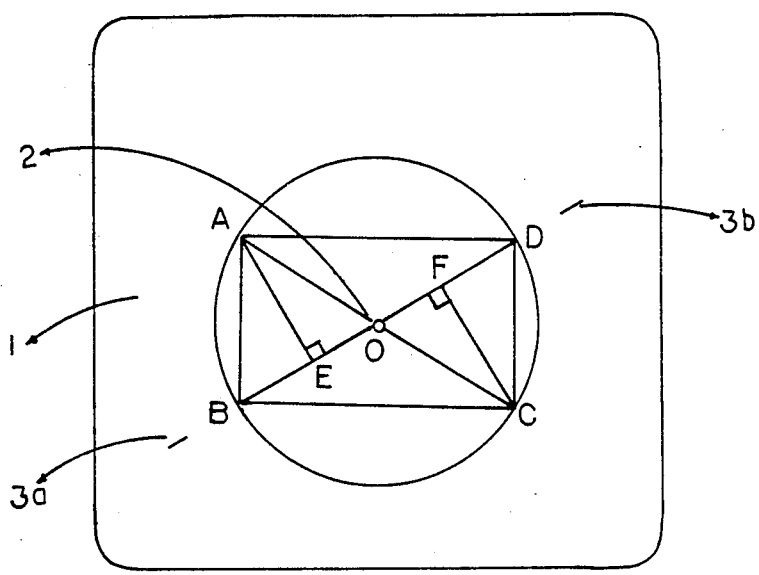
FIG. 24 is a front view of the picture member of the interchangeable rotary image device which comprises a flat surface, opaque or transparent; a fastener such as a drive pin, conic clip, or snap fastener, is mounted on the entre of rotation of the flat surface of the picture member or embodied on the flat surface. The flat surface of FIG. 24 includes a geometric picture for the underlaid picture member.

FIG. 24 is a front view of the underlaid picture member for the interchangeable superimposed picture image members for FIGS. 26, 28, 29, and 30. This picture member includes a transparent or opaque flat surface 1 with a prescribed print for a rectangle ABCD inscribed in a circle with center O the entre of rotation. AE and CF are perpendicular to the diagonal BD and the other diagonal AC joins the opposite vertices A and C. The mounted fastener 2 at the entre of rotation is a drive pin, a conic clip or snap fastener adapted for use for mounting the interchangeable flat circular discs which include superimposed picture image members for FIGS. 26, 28, 29, and 30. The marks $3a$ and $3b$ in FIG. 24 are designed for aligning the hairlines on the circumference of the interchangeable picture image members for each of FIGS. 26, 28, 29, and 30.

Figure 25:
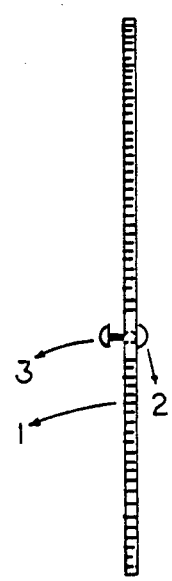
FIG. 25 is a side view of FIG. 24.

FIG. 25 is a side view of the underlaid picture member for the interchangeable superimposed picture image member of FIG. 24. A drive pen or snap fastener 2 is mounted on the back of the flat surface 1 and a flush lid 3 may support a circular disc securely in position.

Figure 26:
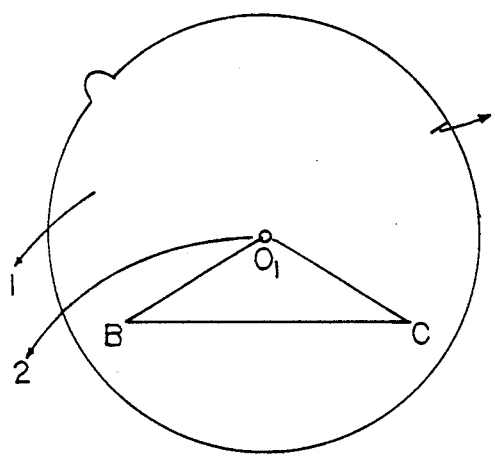
FIGS. 26, 28, 29, and 30 are front views of the image picture members of the interchangeable rotary image device. Those image picture members can be mounted with their centers O on the picture member of FIG. 24 alternatively or simultaneously in pairs.

FIG. 26 is a front view of a superimposed picture image with a flat circular disc 1 which can be pivotally mounted on the picture member of FIG. 24 through a prepared mating hole $O_1$ and hairline 3 for guiding the picture image to the desired location.

Figure 27:
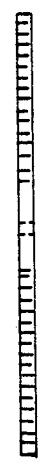
FIG. 27 is a side view of any of FIGS. 26, 28, 29, or 30.
Figure 28:
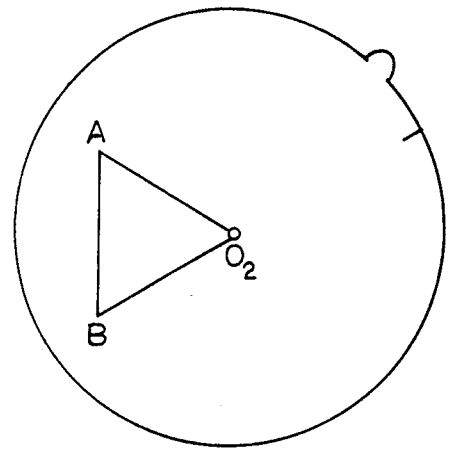
Figure 29:
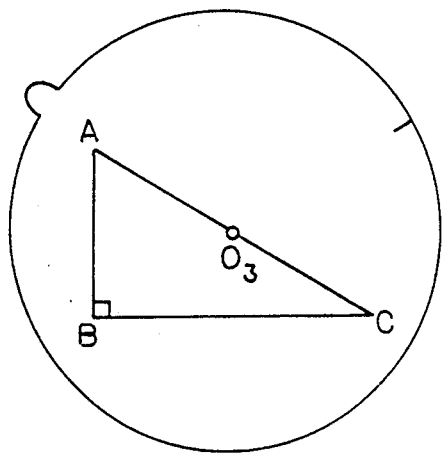
Figure 30:
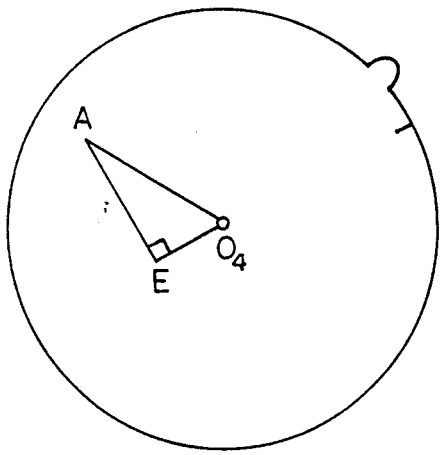

FIG. 27 is a side view for any of the FIGS. 26, 28, 29, or 30. The picture image member of FIG. 26 can be mounted on the picture member of FIG. 24, and through the rotation process triangle OBC can be demonstrated to be congruent to triangle ODA. By interchanging the image picture member of FIG. 26 by FIG. 28 and by using the rotation feature, triangle OAB can be demonstrated congruent to triangle OCD, and by interchanging the image picture of FIG. 28 by the image picture of FIG. 29, triangle ABC can be shown congruent to triangle CDA, and finally by interchanging the picture image picture of FIG. 29 by FIG. 30, triangle OAE can be shown congruent to triangle OCF.

FIG. 31 is a front view of another underlaid picture member as additional application for the interchangeable superimposed picture image members of FIGS. 32 through 36. Those manipulatives demonstrate applications of theorems of a circle in geometry. The hairlines on both picture and picture image members may not be indicated since the rotation process can be at any desired position relative to the entre of rotation O of FIG. 31. The picture image member in FIG. 32 can be mounted with its center $O_1$ on the picture member O of FIG. 31. Thus the rotation of FIG. 32 demonstrates an application of a geometric theorem which states "If a line is tangent to a circle, then the radius drawn to the point of tangency is perpendicular to the tangent."

Figure 33:
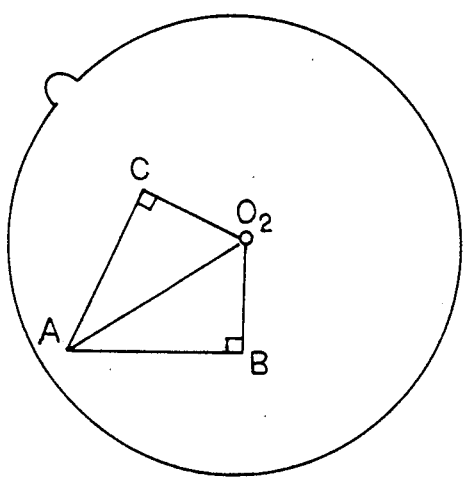
Figure 34:
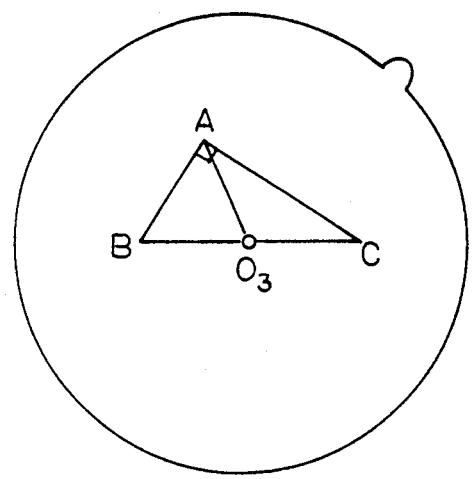
Figure 35:
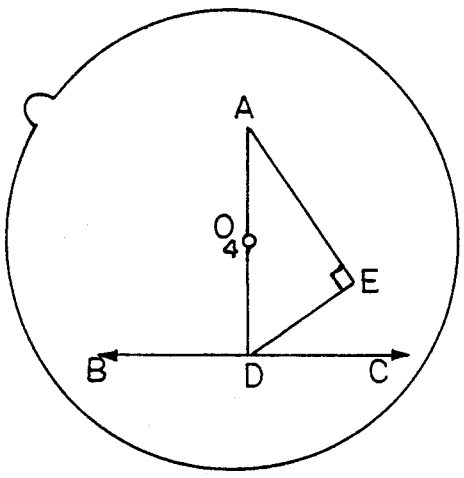
Figure 36:
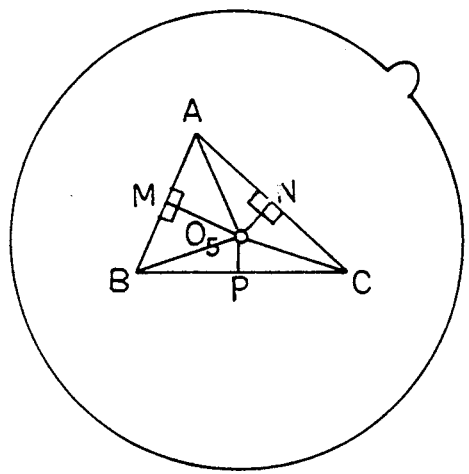

The replacement of the image picture member in FIG. 33 for the underlaid picture member of FIG. 31 demonstrates a theorem in geometry which states "The tangents to a circle from an exterior point are equal." The interchangeable image picture in FIG. 34 demonstrates two geometric theorems which state "An inscribed angle in a semicircle is a right angle." and "In a right triangle, the median drawn to the hypotenuse is half as long as the hypotenuse." The image picture member in FIG. 35 may be mounted with its center $O_4$ on the underlaid picture member of FIG. 31 to demonstrate "An angle formed by a chord and a tangent is equal to half the inscribed arc." And finally, the image picture member of FIG. 35 may be replaced by FIG. 36 to demonstrate "The perpendicular bisectors of the sides of a triangle intersect in a point O which is equidistant from the vertices of the triangle. O is the center of the circumscribed circle."

FIG. 37 is a front view of underlaid picture member of a cartesian plane for changeable superimposed picture image members for FIGS. 39-43. The cartesian plane member in FIG. 37 includes a mounted snap fastener, a clip pin, or a drive pin on the origin of the coordinate axes of the cartesian plane.

Figure 39:
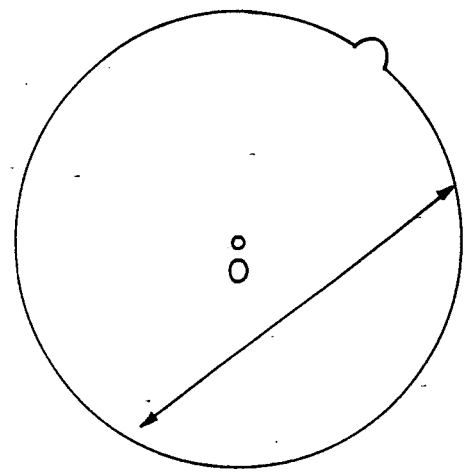
Figure 40:
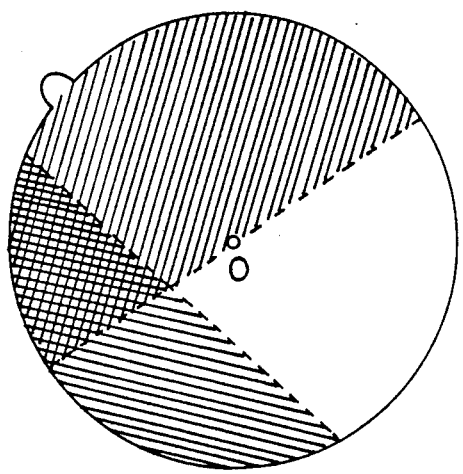
Figure 41:
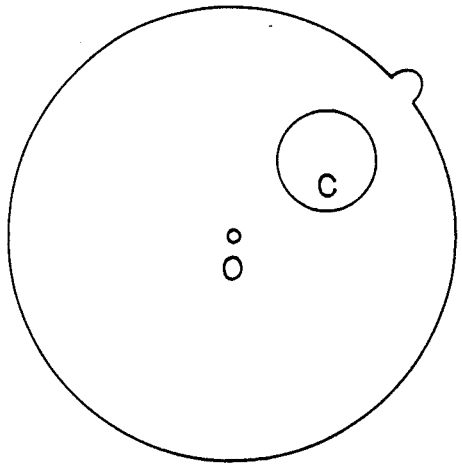
Figure 42:
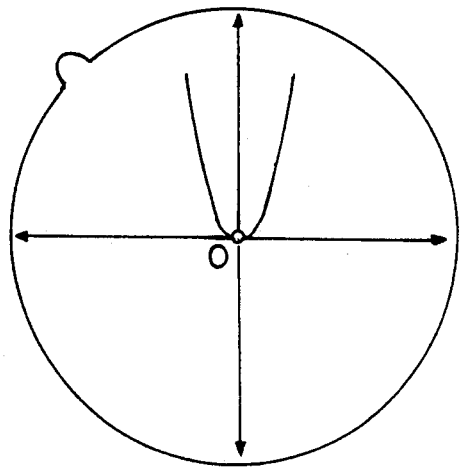
Figure 43:
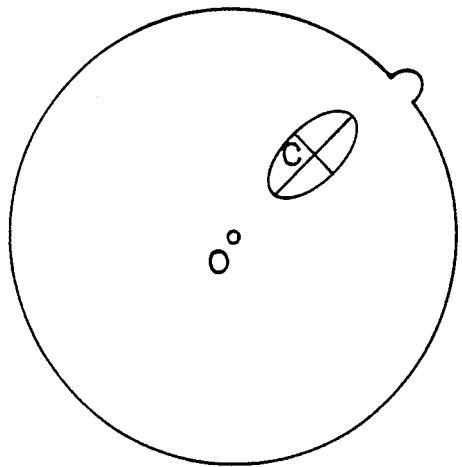

FIG. 38 is a side view of the underlaid picture member of the cartesian plane of FIG. 37. FIGS. 39 through 43 can be mounted independently on FIG. 37 to demonstrate applications or problem solving for algebraic graph which represents linear systems or algebraic equations of conic sections in algebra. The picture image may include any other graph which represents algebraic linear systems or algebraic equations. FIG. 39 can be mounted simultaneously with each one of FIGS. 41, 42, or 43 on the cartesian plane member 37. The objective of mounting a pair of superimposed picture images is to demonstrate the intersection of the picture image member 39 with each of the circle, parabola, or ellipse on the picture image mambers 41 through 43. FIG. 39 can be mounted on FIG. 37 and rotated about the origin of the coordinated axes. The process can be followed by replacing the picture image member 39 by each of the picture images for FIGS. 40 through 43. The rotation of FIG. 40 generates a family of two linear inequality systems in two variables relative to the origin of the coordinate axes. For FIGS. 41 through 43, a famiłły of algebraic equations for circles, parabolas, or ellipses can be generated relative to the origin of the coordinate axes.

FIG. 44 is a front view of the translating pictorial image device which includes a transparent or opaque flat picture frame member $1a$ embodied two parallel channel track strips $1b$ and $1c$ which slanted in U-shape grooves. A changeable picture member 2 which includes triangle ABC is mounted on top of the picture frame member and can be held in a stationary position. In another alternative embodiment of FIG. 44 the picture member 2 can be mounted on the back of the picture frame member through two parallel track strips or four picture corner holders. In the preferred form of the translating pictorial image device of this invention, the geometric picture is printed on the picture frame member and the image picture member includes the image picture which slides over the stationary picture print of the frame member. Thus the translating pictorial image device may include two members instead of three as previously described. The superimposed picture image member 3 with triangle DEF can be translated over the stationary picture member 2. Additionally, the superimposed picture image member 3 can be mounted in three additional permutational positions. For example the picture image member 3 can be mounted on a flipping over position, upside down position, then on a flipping over position again in that sequence. In each version of those setting positions of the image picture member, one of the four indicated color hairlines of the image picture image picture member matches up with each corresponding mark of the indicated color hairlines of the set on the picture member. The process of matching color hairlines guides the translation feature of triangle DEF over triangle ABC in each one of the four setting positions as previously described. For example, the hairline a on the image picture member may match up with each mark of the indicated color hairlines of set a on the picture member. The configuration of the two congruent triangles ABC and DEF applies wide varieties of proving geometric problem solving on SSS, SAS, ASA postulates; and SAA theorem. The proving process for problem solving on congruent triangles starts with the given conditions (the hypothesis) such as congruent sides, congruent angles, statement(s), or indicated marks on the diagram. These given conditions are used in deducing sequential statements of reasoning patterns which lead to prove the congruent triangles, the corresponding parts of the two congruent triangles, or a geometric statement (the conclusion). Thus many geometric problems can be created by marking indicating identical marks to designate the congruent angles of the corresponding parts of the two triangles, and question marks or exclamation marks designate the statement(s) needed to be proved. The picture member 2 and the image picture member 3 can be interchanged with other sets of picture prints for pairs of congruent acute triangles, obtuse congruent triangles, right congruent triangles, isosceles congruent triangles, or right isosceles congruent triangles. The process of demonstrating geometric problem solving for a set of congruent triangles can be applied as previously described.

FIG. 45 is a side view of the translating pictorial image device, 1a is a flat surface for the picture frame member embodied two parallel channel track strips in U-shape grooves 1b and 1c extended along the lengths of the rectangular flat surface near the sweeping ends. The picture member 2 is underlaid the superimposed picture member 3 and both picture and picture members are mounted on the two parallel channel track strips 1b and 1c.

FIG. 46 is a front view of the replacement of the superimposed picture member 3 of FIG. 44 and overlays the picture member 4 of triangle ABC. The translation process guided by the hairlines alignment may be applied in demonstrating the applications of similarity theorems of two similar triangles. Four permutational settings can be applied for mounting the picture image member in FIG. 46 as previously described in the picture image member 3 of FIG. 44.

FIG. 47 is a side view of FIG. 46.

FIG. 48 is a front view of the incorporated rotary and translating pictorial image device. The picture frame member 1a embodied two parallel channel track strips 1b and 1c. The picture member 2 includes angle B mounted on the picture frame member through the two parallel track strips. The superimposed member is a composite of a flat circular disc 4 with its center 5 pivotally mounted on the flat surface 3 and an indicating hairline 7 on the circumference of the circular disc. The circular disc includes a picture print of BA parallel to CE, and they are cut by the transversal AC which contains the center of the circle 5 at midpoint of AC. The underlaid flat surface 3 includes triangle ABC with CE parallel to BA and D is contained on BC. The alignment of hairline 7 with each of hairlines 6a and 6b may guide the rotation feature of the circular disc to the desired locations as previously described. This incorporated rotary and translated pictorial image device of FIG. 48 demonstrates visually the deductive reasoning used in proving two prominent theorems in geometry which state "The sum of the angles of a triangle is 180° and "In a triangle the measures of an exterior angle equals the sum of the measures of the two remote interior angles." The process of demonstrating the proofs of those two theorems is to translate the underlaid flat surface 2 so that the vertex of angle B' coincides on the vertex of angle B then translated again to coincide on vertex C of angle ECD. Plane surface 3 along with disc 4 can be also translated over the surface 2 so that each of the vertices B and C coincide on B' and that is another optional translation. Geometrically, angles B and ECD are congruent because they are corresponding angles and the lines BA and CE are parallel. This translation feature visually demonstrates angle B congruent to angle ECD. Now the circular disc can be rotated and with the alignment of the hairline on the disc with each of the two indicated hairlines on the flat surface 3, angle A can be visually demonstrated congruent to angle ACE. Geometrically those two angles are congruent because they are alternate interior angles and BA is parallel to CE. Thus the two theorems can be proved by showing that the sum of the measures of angles B, A, and ACB is 180° and angle ACD is equal to the sum of the measures of angles A and B.

FIG. 50 is a front view of the underlaid picture member 1, and the overlaid composite of the circular disc 3 which is mounted on the flat surface 2. In FIG. 50, hairline 6 on the circumference of the circle is aligned with hairline 5b, which guarantees vertex A to coincide on point C.

FIG. 49 is a side view of the incorporated rotary and translated pictorial image device for FIG. 48. The picture member 2 is mounted on the picture frame member through the two parallel channel track strips 1b and 1c underlaid the flat surface 1a of the picture frame member. The composite superimposed picture image member includes the flat surface circular disc 4 pivotally mounted with its center 5 on the flat surface 3.

FIG. 51 is a side view of FIG. 50. Parts 1, 2, 3, and 4 of FIG. 51 correspond to parts 1, 2, 3, and 4 of FIG. 50 as previously designated and described in the illustration of the drawings of the front view of FIG. 50.

FIGS. 52 and 53 are front views of the reflecting pictorial image device in the closing and open positions. The set of diagrams in 1 through 8 of FIG. 52 is a front view of the reflecting pictorial image device with a set of geometric diagrams on the picture image member of a transparent flat surface, superimposed another set of diagrams on the picture image member. The two flat surface members have a common edge 9 and are attached by a pair of hinge fasteners in a folding position. Diagrams 1 and 4 represent two pairs of similar triangles and diagram 2 represents two similar pentagons. Diagrams 3, 5, and 6 represent pairs of overlapping congruent triangles. Diagram 7 represents two coincident congruent isosceles triangles with BC containing the common edge 9. The pictorial diagram 8 represents two overlapping three perpendicular planes on each flat surface to form a cube.

FIG. 53 is a front view of the superimposed picture image member on left and the picture member on right in an open position. Both members are laid on a flat surface with edge 19 in common. Diagrams 1 through 8 in FIG. 53 are contained on the picture member and diagrams 9 through 15 are the corresponding on the superimposed picture image members. The applications of the postulates and the theorems of similar polygons and overlapping triangles, and the property of a cube in geometry for diagrams 1 through 8 of FIG. 52 do not appear visually perceptible to the students. FIG. 53 visually demonstrates clear pictures of corresponding similar triangles, similar pentagons, and overlapping congruent triangles as pictured in diagrams 1 through 8 on plane 17 and diagrams 9 through 15 on plane 18 with ordered pairs of the set of diagrams 9 and 1, 10 and 2, 11 and 3, 12 and 4, 13 and 5, 14 and 6, 15 and 7, then 16 and 8. The sets of the ordered pairs of the corresponding overlapping congruent triangles, similar triangles, and similar pentagons can be visualized clearly. The corresponding parts of the diagrams in FIG. 53 are the key of problem solving for congruent triangles and similar polygons in geometry.

FIG. 54 is a front view of two folded flat surfaces 1 of a picture member and a superimposed picture member which are attached by hinge fasteners 4 and 5. Two coincident circular discs 2 are pivotally mounted with their centers 3 on the flat surfaces and are intercepted between the two flat surface members. One underlaid picture member embodied two track strips 6 and 7 with grooves inside and extended to overpass a mounted circular disc on the picture member to prevent an air vacuum created between the two mounted circular discs as a result of closing the two flat surface members.

FIG. 55 is a front view of the picture members 1 and 2 when the two flat surfaces are open in a flat position and laid on a plane with hinges 7 and 8 binding the picture members. The circular disc 3 of the superimposed picture member is pivotally mounted with its center 5 and the circular disc 4 pivotally mounted with its center 6 on the flat surface 2. The circular disc 3 can be rotated through the two track strips 9 and 10.

FIG. 56 is a side view of FIG. 55 with flat surface 1 of both picture and picture image members. The flat surface circular discs 2 are pivotally mounted with their centers 5 on the flat surface 1. The flat surfaces of picture members are attached by hinges 3 and 4 and the two track strips 6 and 7 embody the picture member 1.

FIGS. 54, 55 and 57 demonstrate the process for proving a prominent theorem in geometry suing the incorporated reflecting and rotary device. This theorem states the "In a right triangle, the altitude to the hypotenuse divides the triangle into two triangles which are similar to each other and to the original triangle." This theorem follows another geometric theorem to find the lengths of the two legs and the altitude to the hypotenuse.

FIG. 55 includes a right triangle ABC on the flat surface of the picture member 1 with angle A a right angle and the altitude to the hypotenuse AD. The superimposed picture image member includes the circular disc 3 pivotally mounted at the center 5 of the disc and contains a picture print of the right triangle ADB. The circular disc 4 is pivotally mounted with its center 6 on flat surface 2 and includes triangle A'B'C' which represents the reflection of triangle ABC. The center D' of the circular disc 6, i.e. the projection of A' on C'B', is symmetric with D relative to the line that contains the hinge fasteners of the two planes. FIG. 54 represents the folding position of the two flat surfaces of FIG. 55 which intercept the two circular discs. The geometric picture of FIG. 54 represents the theorem of similar right triangles. In FIG. 55, the hairline 16 is aligned with 14 and the hairline 13 is aligned with 11. In FIG. 57, the hairlines alignment are set to the desired positions such that the hairline 6 aligned with 5 and 3 aligned with 2. It is obviously clear in FIG. 57 that triangles B'D A', ADC, and B"A"C" are similar. In FIG. 57, triangle B'DA' is the superimposed image picture of triangle BDA and hence they are congruent. Thus triangles BDA, ADC, and BAC are similar. The process of proving the similarity of the triangles is to show the corresponding angles are congruent, according to AA similarity theorem. This can be easily established by showing the reflexive property of a common angle in the two congruent triangles, and by applying a geometric theorem which states "Complements of congruent angles or the same angle are congruent. The overlapping similarity of the right triangles in FIG. 54 is difficult to visualize and consequently the students may not be able to establish the written proportionalities of the corresponding sides of the similar right triangles. FIG. 57 visually demonstrates the similarity of the right triangles and the proportionalities of the corresponding sides, which are readily perceived.

FIGS. 58 through 60 are front views of another application for the incorporated rotary and reflecting pictorial image devices which demonstrate the proof of a geometric theorem on the circle. FIG. 59 includes a picture member on right with O an exterior point of a circle which is also the image of the center O' of the circular disc on the left. The secants OA and OB intersect the circle at D and C respectively. Chord AC joins A and C and chord BD joins B and D. The circular disc in FIG. 59 is pivotally mounted at the center O' of the circle and includes the reflecting triangle O'A'C'. It is clear that triangle O'A'C' is symmetric with triangle OAC. FIG. 58 is a front view for the closed position of the two flat surfaces of FIG. 59.

The theorem demonstrated in FIGS. 58 through 60 states "If two secant segments are drawn to a circle from an exterior point, then the product of one secant and its external segment equals the product of the other secant and its external segment." The process of proving this theorem is based on showing the similarity of the two triangles OAC and OBD in FIG. 58. In FIG. 59, the hairline 1 is aligned with 2 then the disc may be rotated so that triangle O'A'C' is positioned to the desired setting position O'A"C" in FIG. 60. In FIG. 60, the hairline 1 is aligned with 3 and triangle O'A"C" is visually demonstrated similar to triangle OBD. The corresponding sides of the two similar triangles are proportional and the property of proportions can be applied. Thus the theorem can be easily proven. The picture of the overlapping similar triangles OAC and OBD in FIG. 58 are not visualized clearly similar as demonstrated in FIG. 60.

FIGS. 61 through 63 are front views of an additional application for the incorporated rotary and reflecting pictorial image device which demonstrates the proof of another geometric theorem on circles. FIG. 62 includes a picture member on right with O an exterior point of a circle, OA is tangent to the circle at A, OB is a secant, and chord AC joins points A and C. The circular disc in FIG. 62 is pivotally mounted at the center O' of the circle such that O' is symmetric with O and the underlaid plane includes the reflected triangle O'C'A'. Thus triangle O'C'A' is symmetric with triangle OCA. FIG. 61 is a front view of the closing position of the two flat surfaces of FIG. 62. FIG. 61 through FIG. 63 demonstrate a geometric theorem which states "If a tangent and a secant segment are drawn to a circle from an exterior point, then the square of the tangent is equal to the product of the secant and its external segment." The process of proving this theorem is similar to the theorem described previously in FIG. 58 through FIG. 60. By using the hairlines alignment in FIGS. 62 and 63, triangle O'C'A' on left of FIG. 62 can be rotated to the desired position O'C"A" in FIG. 63. It is obviously clear in FIG. 63 that the two triangles O'A"C" and OBA are similar. Again, the corresponding parts of the two similar triangles are proportional and the property of proportions can be applied. Thus the theorem can be easily proven. The picture of the overlapping similar triangles OAC and OBA in FIG. 61 is not visually clear and appears ambiguous. However, the similarity between those triangles in FIG. 63 can be clearly demonstrated.

I claim:

1. A visual aid for graphically demonstrating geometric problem solving and geometric proofs, comprising:
   (a) a base member having an inscribed geometric figure and including indicia for naming the geometric figure;
   (b) a transparent overlaying member having a second geometric figure for superimposing the second geometric figure on the first geometric figure, wherein the second geometric figure has a predetermined relationship to the first geometric figure;
   (c) means for mounting the overlaying member to the base member for relative translational movement with respect to the base member so that the second geometric figure can be moved from one selected position to another selected position relative to the geometric figure on the base member;
   (d) a second overlaying member having a third geometric figure inscribed thereon for superimposing the third geometric figure on the first and second geometric figures, wherein the third geometric figure has a predetermined relationship with the first and second geometric figures; and
   (e) means for rotatively mounting the second overlaying member on the first overlaying member so that the third geometric figure can be moved from one selected position to another relative to the second geometric figure.

2. The visual aid according to claim 1 adapted for proving at least one of the geometric theorems "The sum of the angles of a triangle is 180°; and "In a triangle the measures of an exterior angle equals the sum of the measures of the two remote interior angles."

3. The visual aid according to claim 2 adapted for proving geometric theorem "If a tangent and a secant segment are drawn to a circle from an exterior point, then the square of the tangent is equal to the product of the secant and its external segment."

4. A visual aid for graphically demonstrating geometric problem solving and proving geometric theorems, comprising:
   (a) a pair of flat base members hingedly connected along one common edge so as to be moveable between a folded condition in which the base members overlie one another and an unfolded condition in which the base members lie side-by-side; wherein at least one of said base member include a first geometric figure imprinted thereon;
   (b) a generally circular overlaying member rotatively mounted to the other of said base members and including a second geometric figure thereon, having a predetermined relationship to the first geometric figure wherein the second geometric figure can be rotated and reflected with respect to the first geometric figure.

5. The visual aid according to claim 4 adapted for proving a geometric theorem "If two secant segments are drawn to a circle from an exterior point, then the product of one secant and its external segment equals the product of the other secant and its external segment."

* * * * *